United States Patent [19]

Schlueter et al.

[11] Patent Number: 5,161,912

[45] Date of Patent: Nov. 10, 1992

[54] APPARATUS AND METHODS FOR AGRICULTURAL IRRIGATION

[76] Inventors: James C. Schlueter; Lorri J. Schlueter, both of 230 Lake St., Ft. Morgan, Colo. 80701

[21] Appl. No.: 602,403

[22] Filed: Oct. 23, 1990

Related U.S. Application Data

[63] Continuation-in-part of Ser. No. 515,580, Apr. 26, 1990, Pat. No. 5,039,251.

[51] Int. Cl.[5] .................... A01G 25/16; A01G 25/02
[52] U.S. Cl. ........................................ 405/39; 405/43; 405/51; 137/875; 137/816
[58] Field of Search ............... 137/875, 876, 624.2, 137/625.29, 625.46, 887; 405/36, 39, 40, 43, 44, 45, 51; 239/444, 450

[56] References Cited

U.S. PATENT DOCUMENTS

| | | | |
|---|---|---|---|
| 1,484,575 | 2/1924 | Shulin . | |
| 3,539,106 | 11/1970 | Ramik | 239/145 |
| 3,698,195 | 10/1972 | Chapin . | |
| 3,860,179 | 1/1975 | Costa | 239/542 |
| 3,912,165 | 10/1975 | Pira | 239/11 |
| 4,123,006 | 10/1978 | Yukishita | 239/266 |
| 4,162,041 | 7/1979 | Hane | 239/266 |
| 4,267,972 | 5/1981 | Bryant | 239/66 |
| 4,332,105 | 6/1982 | Nir | 47/1 R |
| 4,824,019 | 4/1989 | Lew | 239/201 |
| 4,917,535 | 4/1990 | Prassas | 405/36 |

Primary Examiner—Randolph A. Reese
Assistant Examiner—John A. Ricci
Attorney, Agent, or Firm—Dorr, Carson, Sloan & Peterson

[57] ABSTRACT

An agricultural irrigation system comprised of a plurality of unit pipes which constitute a water supply pipe line and another plurality of unit pipes which constitute a plurality water dispensing line each of whose respective pipe units are connected to respective center, valve/connectors which couple successive pipe units of the water supply pipe line.

10 Claims, 12 Drawing Sheets

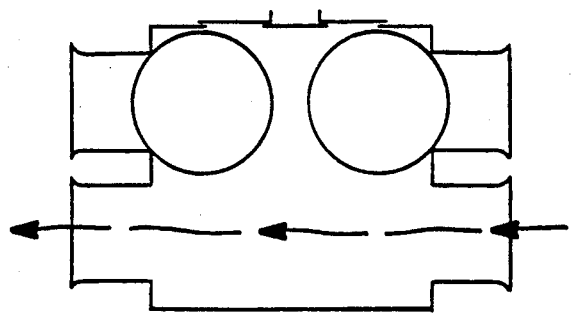
Fig. 1E
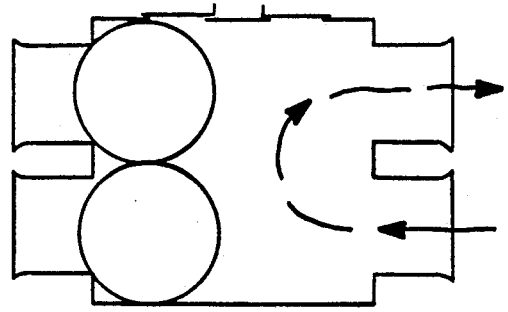
Fig. 1F
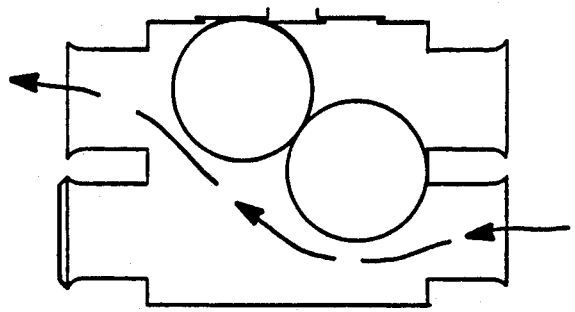
Fig. 1G
Fig. 1H
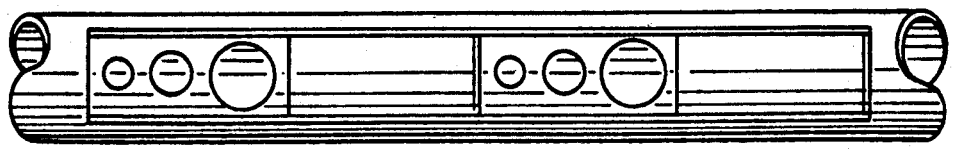

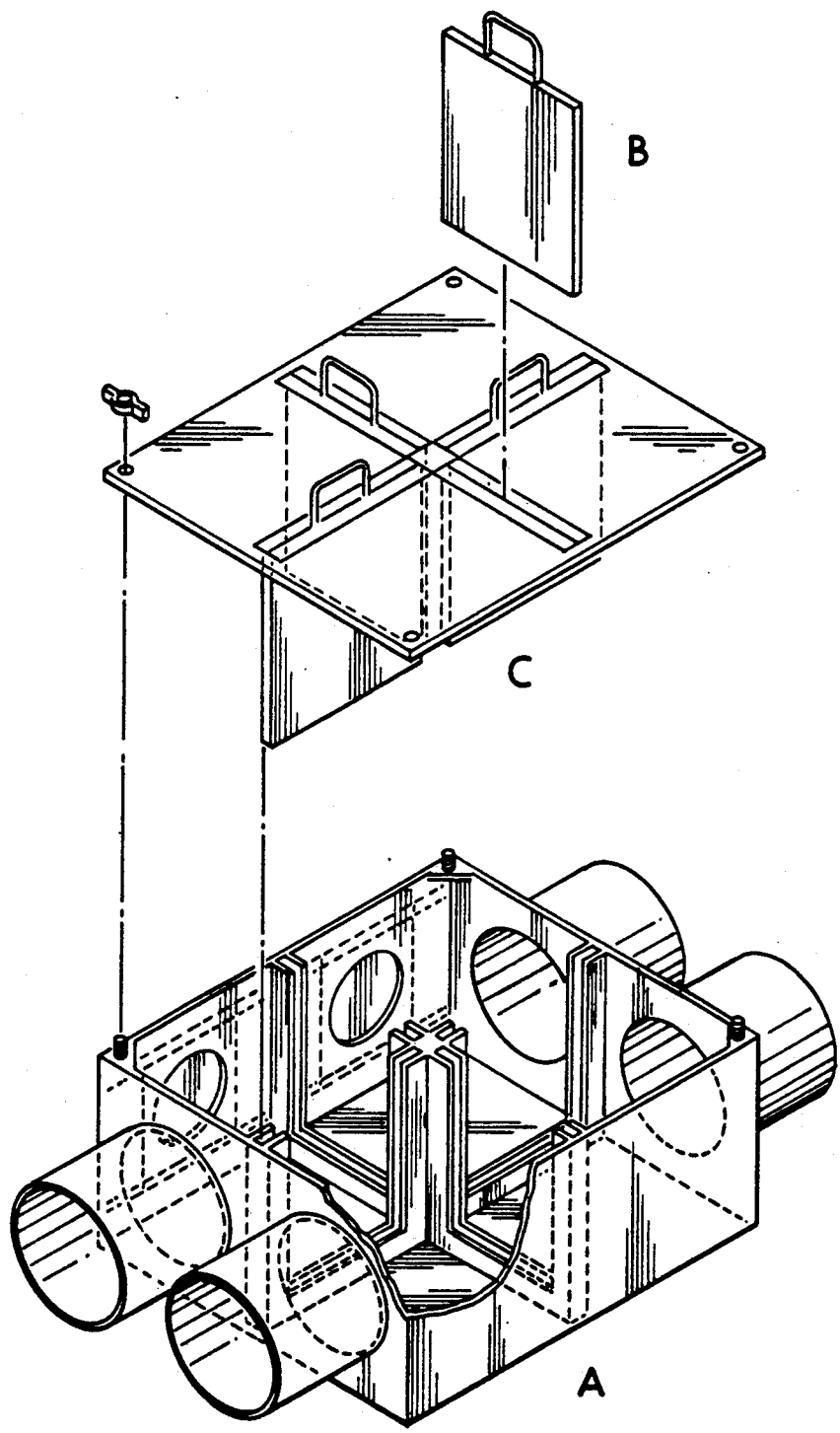
Fig. 1-J

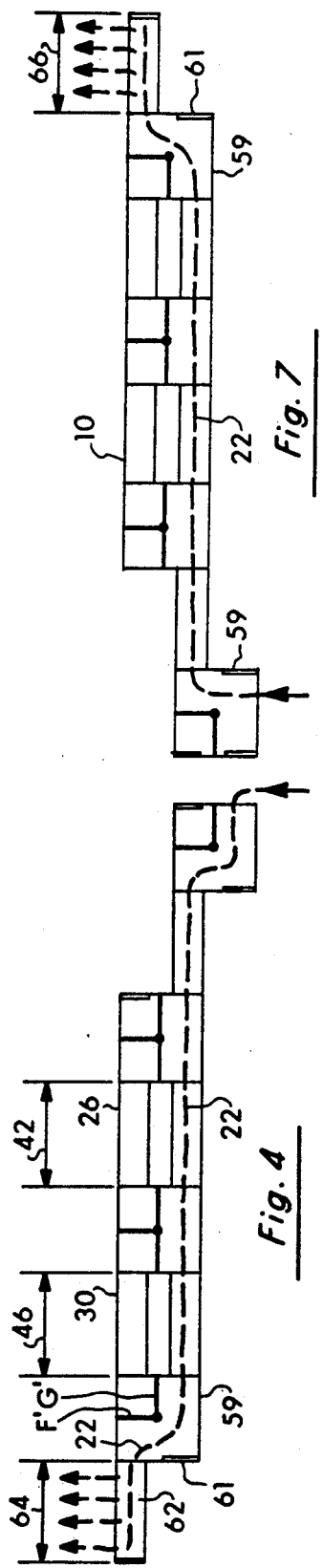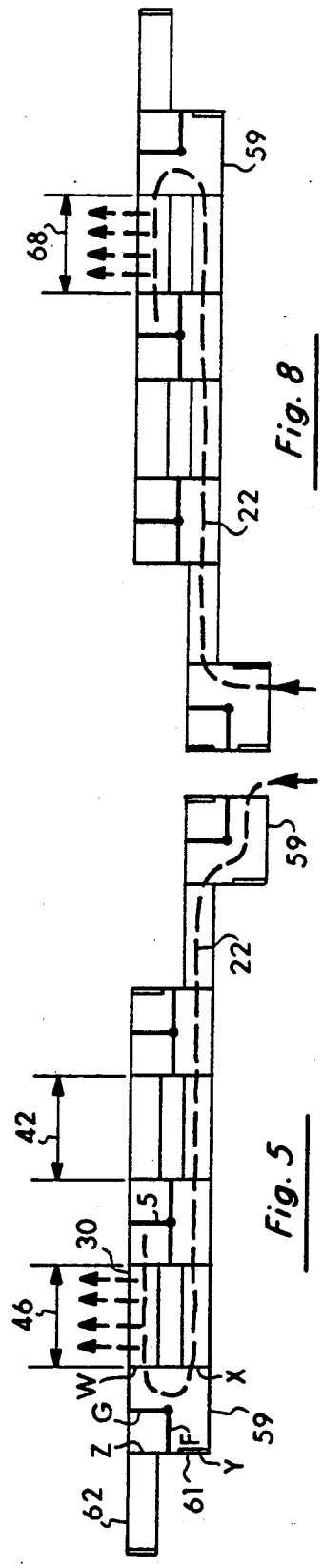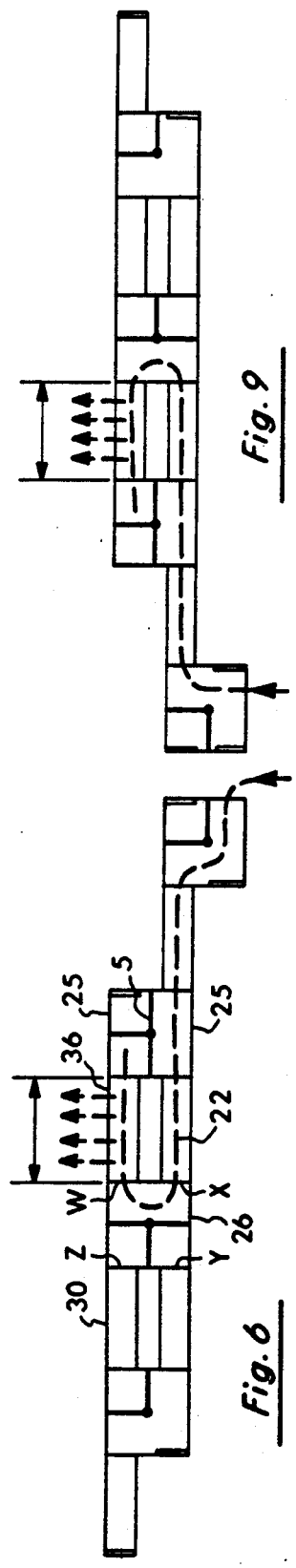

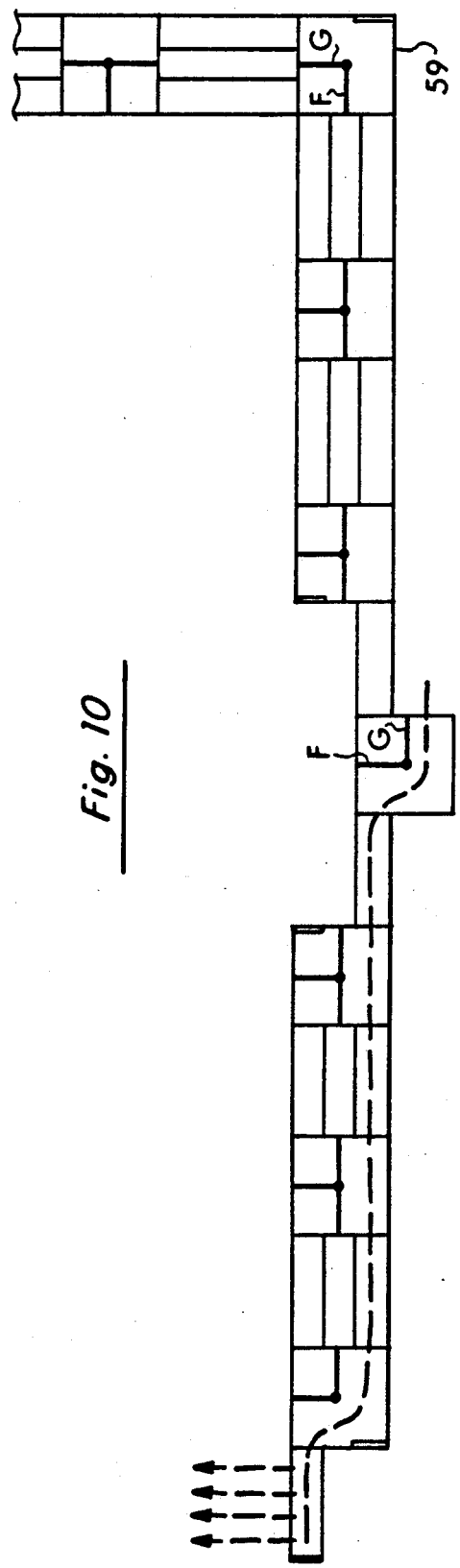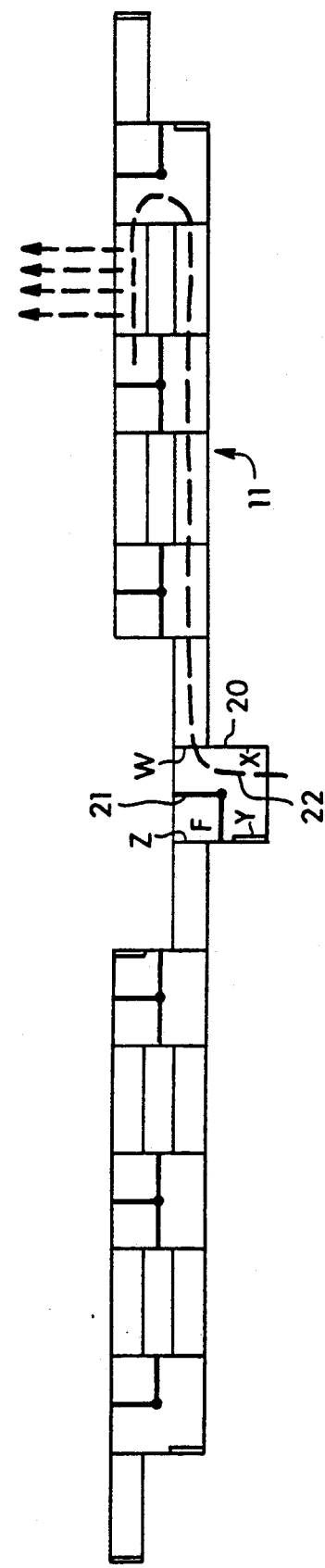

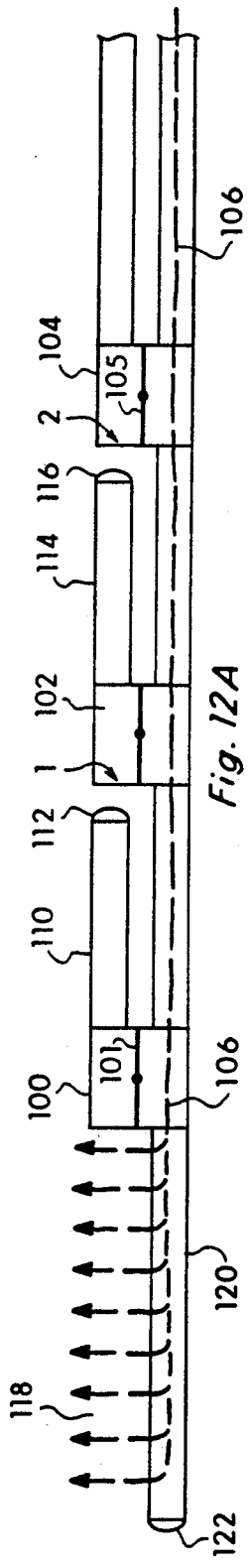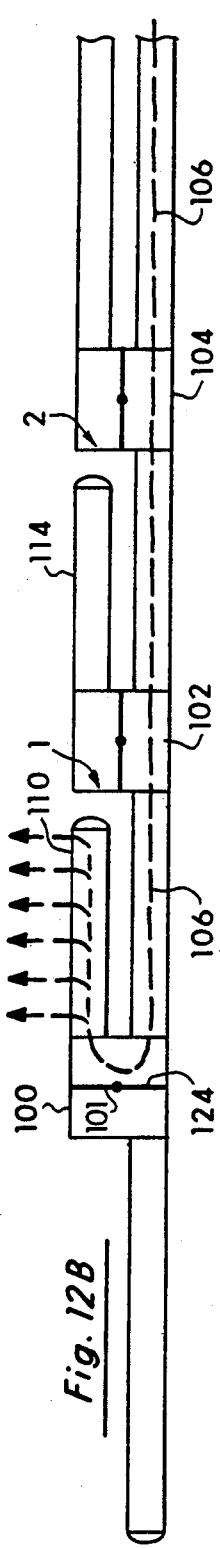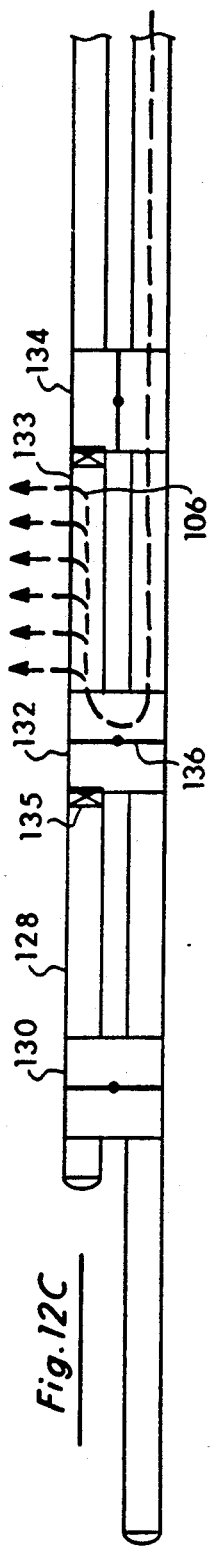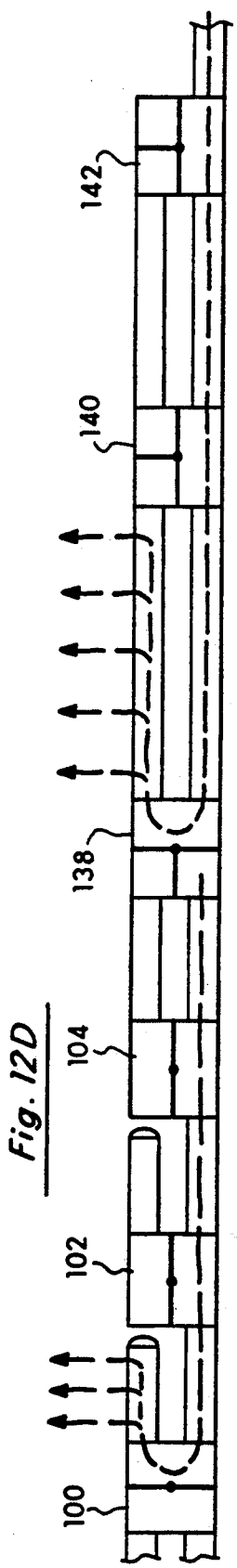

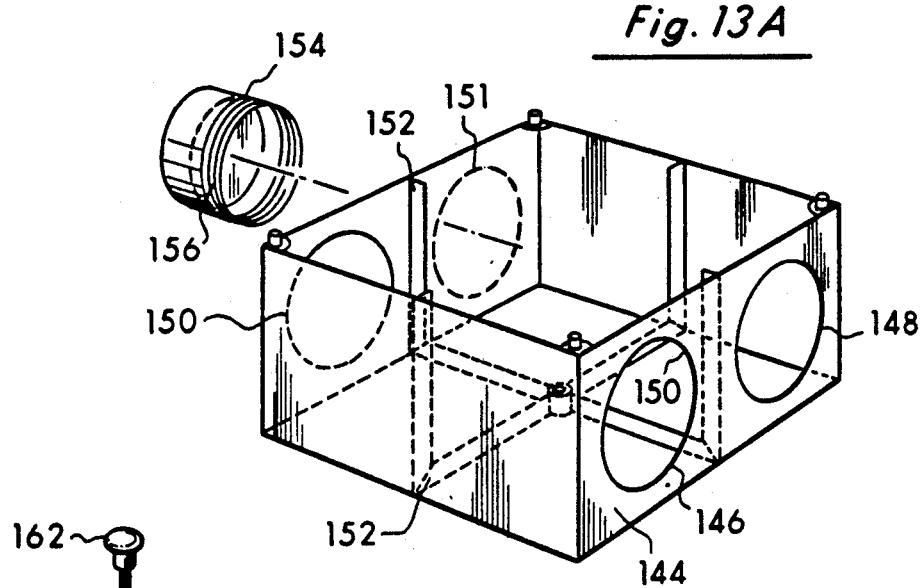
Fig. 13A
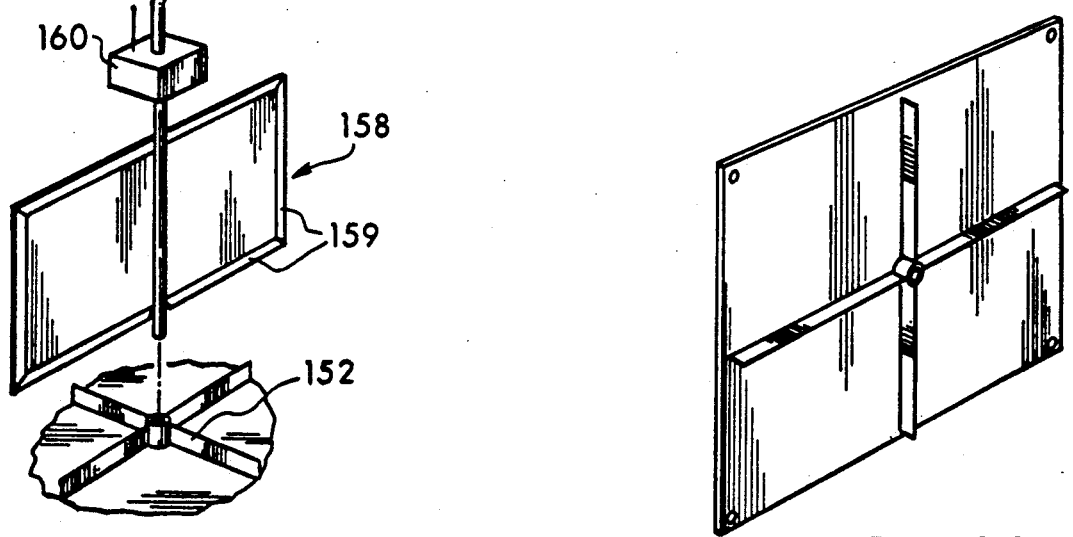
Fig. 13B
Fig. 13C

APPARATUS AND METHODS FOR AGRICULTURAL IRRIGATION

CO-PENDING APPLICATIONS

This patent application is a continuation-in-part of U.S. patent application Ser. No. 515,580 filed Apr. 26, 1990, now U.S. Pat. No. 5,039,251.

FIELD OF THE INVENTION

The apparatus and methods of this patent disclosure are generally concerned with agricultural irrigation systems. More specifically this invention is concerned with agricultural irrigation systems designed to deliver uniform water flow rates over the length of such irrigation systems.

BACKGROUND OF THE INVENTION

Single-pipe agricultural irrigation systems comprised of an interconnected series of water sprinkling pipes are used extensively in agriculture, horticulture and golf course maintenance. Typical single-pipe systems emit water from many holes along the entire length of a given pipe series. This is usually accomplished with the aid of hydrostatic pressure delivered by pumps. Hence water and/or other liquids (such as fertilizers) are sprayed or otherwise released into crop growing areas contiguous to the pipe series. However, differences in hydrostatic pressure develop as the series of watering pipes is extended. That is to say, fluid pressure decreases from the pipe nearest the water supply pump to the pipe most remote from that pump. This pressure decrease causes different amounts of water to be released over the length of the pipe series. For example, longer sprinkling distances are created in areas nearer to the water pressure source and shorter sprinkling distances are experienced in areas more remote from that source of water pressure. Concomitantly, those water dispensing holes which are under greater fluid pressure deliver greater volumes of fluid than those at the end of the pipe series.

In most cases it is generally regarded as being undesirable to have different sprinkling rates, volumes and/or spray distances for any given field under cultivation. However, in some cases, field conditions may dictate changes in water requirements. One simple example of this would be the case where one desires to supply more water to an area receiving more abundant sunshine while limiting water delivery to a contiguous shaded area under cultivation with the same crop. Other kinds of problems can arise from water delivery variations. Not the least of these is the fact that some areas may be over fertilized as well as overwatered while other areas are under fertilized and/or underwatered owing to the fact that fertilizing liquids are often mixed in with the irrigation water being dispensed.

For the most part, water uniformity in such single-pipe systems is pursued by adjusting the flow rates and/or pressures of the water being released, use of alternative watering systems and/or movement of individual pipe elements to create other pipe system configurations. Some prior art attempts to better regulate irrigation water flow have employed two or even three main water supply pipes which are interjected at different places in the system in order to try to minimize water pressure differences along the length of a given pipe series. However, use of such multiple main water supply pipes systems implies higher capital cost as well as those higher labor costs implicit in any field modifications of such multi-pipe systems.

Other sprinkling devices employing a single pipe which is divided into two separate chambers have been employed in order to minimize some of the above-noted pressure differential problems. Most of these two-chambered, single pipe systems are comprised of a series of elongated pipes each of which are divided into two distinct chambers by a separator wall running in the pipe's lengthwise direction. Typically, one chamber has a large cross section and the other has a smaller cross section. Hence the large section best serves as a water supply pipe and the smaller as a water dispensing pipe. The supply pipe chamber and the dispensing pipe chamber are placed in fluid communication with each other by a certain number of holes in the interior wall between the chambers for every unit length of pipe. Consequently, any water or other liquid introduced into the water supply pipe flows into the water dispensing pipe through such communication holes and is thereafter sprinkled from other holes in the outside walls of the water dispensing pipe. The size of the fluid communication holes in the interior walls is adjusted from the outside of the pipe by means of adjustment bolts which adjust the flow rate of liquid introduced from the supply chamber to the dispensing chamber. Typically, this is done for every unit length of the double pipe. Hence, the sprinkling distances and/or volumes can be adjusted for each pipe unit.

For each unit length of such two chambered pipe, the supply pipe is open at both of its ends and the dispensing pipe is closed at both of its ends. Hence, where a plurality of such pipes are connected in series to construct a water sprinkling system, the supply pipes are in fluid communication throughout their entire length, while the dispensing pipes for each unit of pipe can be regulated. Again, sprinkling distances, volumes, etc. for each unit length must be regulated by means of adjustment screws for the pipe unit. In practice, adjustments and/or settings of such adjustment screws differ as the distance of a given pipe unit from the source of water pressure is increased.

Unfortunately, these two chamber pipes are very difficult, and hence very expensive, to manufacture. This is especially true in the case of those steel pipes which are typically used in large scale agricultural irrigation systems. Consequently, most two chambered pipes are manufactured by extrusion of synthetic resin materials. However, problems of quality control do occur even when working with extruded synthetic resins. Problems are particularly apt to occur in the cooling of recently extruded resins wherein shrinkage occurs in the separator wall. This shrinkage gives rise to the formation of cracks and separations and, hence, introduces possibilities for leakage from the water supply chamber to the water dispensing chamber. At best then, such synthetic resin, two chambered pipes are only suited to small scale, low pressure, water dispensing systems such as those employed in greenhouses.

Furthermore, since the dispensing pipe chamber is closed at both of its ends for every unit length, it is difficult to inspect and/or clean its inside once the pipe is manufactured. This is a serious drawback because dust and dirt or impurities contained in the liquid being dispensed tend to accumulate in the dispensing pipe. This causes the spurting holes of the dispensing pipes to become clogged, and thereby reduces the effectiveness of the entire sprinkling system.

Some small, low pressure, horticultural scale, two-pipe watering sprinkling systems comprised of two essentially separate pipes also have been developed. A representative system of this type is taught in U.S. Pat. No. 4,162,041. This particular system is generally comprised of a connection socket of a first type including a tubular main pipe connection part and a tubular sub-pipe connection part. The connection parts are united to the pipe at a part of the periphery of each connection part. They are also provided with an internal closure near to their centers. A connection socket of a second type, including a tubular main pipe connection part and a tubular sub-pipe connection part, along with such connection parts, are united to each other at the periphery of each connection pipe. They are placed in fluid communication with each other through an opening at the pipe's central portion. This connection of the second type usually includes a valve for adjusting the amount of liquid passing through the opening from the main pipe to the sub-pipe. Consequently, many "fine adjustments" are required because each valve adjustment is contemplated to operate over a continuous range rather than to operate only in an "on" or "off" mode of operation. Moreover, because all sub-pipes are simultaneously fed from the same main pipe, pressure differentials do develop over the length of such a pipe series if more than one sub-pipe is employed at the same time.

In another version of the liquid sprinkling device of U.S. Pat. No. 4,162,041, the connection parts are united to each other at a part of the periphery of each connection part and communicate with each other through an opening at its central portion. In effect all main pipes are in continuous fluid communication. Consequently, water flow cannot be directed to any particular member of the main pipe series of pipes. The connection socket also includes a valve device, disposed near the opening, for adjusting the amount of liquid passing from the main pipe, through the opening and then flowing in the sub-pipe connection part.

This approach gives satisfactory effects in the context of watering those relatively smaller areas used in horticultural, e.g., greenhouse, activities in that the pressure differences do not greatly affect the spray rates and/or spray differences in these relatively small systems. However, as the length of such systems is increased, as in the case of large scale agricultural operations, such two-pipe systems having continuous flow main pipes, become less and less effective because individual sections of the main pipe cannot be placed in exclusive fluid communication with individual sections of the sub-pipe. In other words, problems arise because the full force of the entire incoming water supply is not delivered directly and exclusively to one water dispensing sub-pipe. Again, this drawback takes on more and more importance as the system is extended farther and farther away from the source of hydrostatic pressure.

SUMMARY OF THE INVENTION

The agricultural irrigation systems of this patent disclosure can be thought of as two separate pipe lines. The first is a continuous water supply line connected by means of at least one, but preferably a plurality of center, valve/connector (C,V/C) devices each of which receive a first water supply pipe in a first side of the C,V/C device and, in effect, extend said pipe, in series, by coupling it (by threading means, flange means, etc.) with a second water supply pipe attached to a second, opposite side of said C,V/C device. Each C,V/C device also has a water dispensing hole on its first side to which a water dispensing pipe is attached by appropriate coupling means. The water dispensing pipe is provided with a plurality of fluid dispensing holes which emit water, nutrients, etc. delivered to the C,V/C device by the first water supply pipe. With respect to terminology, it should first be noted that in the case of a "plurality" or series of such C,V/C devices, the first C,V/C device to receive water from a water supply line will be referred to as a "preceding" C,V/C device and the next C,V/C device to receive water from the water supply line may be referred to as a "succeeding" C,V/C device.

Next, it should be noted that there are two main versions to applicants' irrigation system. They generally differ with respect to the means by which the water dispensing pipe is placed under hydrostatic pressure. In a first version each water dispensing pipe is plugged at its end opposite the end which is attached to the C,V/C device. A simple solid (i.e., having no fluid passageway) pipe plug, having either a male or female threaded member, can engage an appropriately threaded end of said water dispensing pipe. Hence, in this first version, the water dispensing pipe can dispense water, but cannot serve to deliver water into the housing of a preceding C,V/C device. That is to say that in this first version, a succeeding water dispensing pipe may be mechanically joined to a preceding C,V/C device, but the water in that succeeding water dispensing pipe does not enter into the preceding C,V/C device, but rather is, in effect, blocked by said C,V/C device. This arrangement is to be contrasted with a second version of applicants' irrigation system, hereinafter more fully described, wherein some or all of the individual water dispensing pipes can deliver water into a preceding C,V/C device. In this second version, the valves of a given preceding C,V/C device can serve to "plug" the succeeding water dispensing pipe and thereby produce hydrostatic pressure in said succeeding water dispensing pipe. There are other differences as well.

For example, in the first version of applicants' irrigation system, each C,V/C device has, in total, three open holes and any associated pipe receiving/ coupling means (e.g., threaded openings, flanges, couplers, etc.). Such a device will sometimes be referred to as a "3-hole C,V/C device" (or "means"). This is to be contrasted with a "4-hole C,V/C device" (or "means") hereinafter more fully described. In contrasting these two species of C,V/C devices it should be noted that two of the 3 holes of such a 3-hole C,V/C device are on a first side of the 3-hole C,V/C device and the third hole is on a second, opposite side of said device. The third hole on the second side is opposite the hole on the first side which receives the first water supply pipe of a water supply pipe series. As will be hereinafter more fully detailed, each such 3-hole C,V/C device will be provided with a valve system (and means to operate said valve system, e.g., hand or remotely operated controls) capable of placing the 3-hole C,V/C device in one of two modes of operation.

In the first mode of operation, fluid communication between successive water supply pipes is achieved by fluid communication through a given 3-hole C,V/C device while fluid communication with that given C,V/C device's water dispensing pipe is blocked by a valve means having an "I"-shaped configuration. In the second mode of operation, fluid communication between successive water supply pipes is blocked and fluid communication is established between the first water supply pipe and the C,V/C device's water dispensing pipe. Such "I"-shaped valves may be configured as gates or balls which are capable of plugging the appropriate holes in a given mode of operation of the C,V/C device. Again such valves may be operated by remote control devices known to the art and/or by hand operated valve positioning means. In all cases, however, the entire incoming flow of the water supply is delivered to a limited number of, and most preferably to only one, water dispensing pipe at any given time. In other words, water is not delivered to all water dispensing pipes at the same time. That is to say that delivering water to all water dispensing pipes at the same time would recreate the distant pipe pressure loss problems encountered by the previously noted prior art systems.

In any case, each hole of such 3-hole C,V/C devices is provided with a pipe receiving/coupling means, such as, for example, threaded holes for receiving threaded pipe ends. Opposing holes may be, and most preferably are, of the same size in order to receive pipe ends of comparable size. However, the two holes on the first side may be of different sizes in order to accommodate pipes of different sizes. For example, in some cases it may prove advantageous to employ water supply pipes having an inside diameter larger than the inside diameter of the water dispensing pipe. Obviously, in the most preferred embodiments of this invention, all such water supply pipes, regardless of their diameters, will be of the same length. It is also contemplated that water supply pipes of standard sizes and/or water dispensing pipes of standard sizes such as those presently used in existing single-pipe agricultural irrigation systems may be employed as the water supply and/or water dispensing pipes in both versions of the irrigation system taught by this patent disclosure. That is to say that standardized, steel irrigation pipes of the most common diameter sizes, e.g., 10", 8" and 6" are highly preferred. Such pipes, however, may be constructed of other materials, e.g., copper, synthetic resin materials, rubber and the like.

The water dispensing pipes contemplated in this disclosure may be provided with water dispensing means (nozzles for dripping, spraying, streaming, etc.) and/or provided with additional mechanical devices such as sub-pipe systems leading from the water dispensing pipes, etc. One particularly useful type of water dispensing pipe for the practice of this invention will be provided with a repeating series of holes of different sizes which can be selectively blocked or opened by a gate system. For example all gates in a given water dispensing pipe unit may be set to cover all openings except those of a given hole size, or they may be set, for example, set with every second, third, etc. hole being of a different size, and so forth. Subsequent water dispensing pipes in the water dispensing pipe series of the system may be set at those same sized, or at different, openings. Again, individual pipe units of the same length are highly preferred for both the water supply series and each individual water dispensing pipe; otherwise, coupling pipe sections will be required.

In another preferred embodiment of 3-hole C,V/C device irrigation system, the end of each water dispensing pipe in a given series of 3-hole C,V/C devices will be coupled to a preceding 3-hole C,V/C device. The coupling can be made to the preceding C,V/C device by any suitable coupling means, e.g., thread engagement, flange connection, compression fit, etc. In any event, the connection will be made to the second side of the center, valve/connector device in the area which is generally opposite to the location of C,V/C's water dispensing pipe. In this version of the irrigation system, whatever the means of coupling the pipe to the preceding C,V/C device, the water dispensing pipe still must be plugged in order to function as a water dispensing pipe—that is to dispense water, under pressure, through its water dispensing holes. The water dispensing pipe may have a separate plug or the preceding C,V/C device may itself also function as a plug. That is to say that in one highly preferred version of this system, the coupling means, i.e., the means which couples a given water dispensing pipe to a preceding C,V/C device, could also serve as the plug for a water dispensing of a succeeding C,V/C device. For example, a plug threaded on each end could both plug the water dispensing pipe and serve as the means of connecting the water dispensing pipe to a preceding center, valve/connector device.

Moreover, as will be made more apparent in ensuing paragraphs of this patent disclosure, some or all of each center, valve/ connector means could be provided with a fourth hole. This fourth hole also would be located on the second side of the C,V/C device in the area which is generally opposite the hole to which the water dispensing pipe is connected. For example, the plugged end of a water dispensing pipe could be inserted into this hole. More preferably, however, this fourth hole could be plugged by a separate plugging device. Such a device could be so adapted and arranged that it serves to both plug the fourth hole and connect to the water dispensing pipe projecting from a succeeding center, valve/connector device of an overall water dispensing means such as a series of C,V/C means and a series of water supply pipes and water dispensing pipes. Here again, this separate plugging device could, for example, be threaded at both ends so that it is capable of engaging, on one end, with a threaded fourth hole in the center, valve/connector device and engaging on the other end with a threaded end of a succeeding water dispensing pipe so that said water dispensing pipe is both plugged and connected to the preceding C,V/C device means by the same plugging device.

Use of a center, valve connector means having a fourth hole (a 4-hole, C,V/C device), which can be plugged by a separate plugging means, is preferred because it makes the overall irrigation system much more versatile. This versatility follows from the fact that there is another version of this invention wherein an irrigation system comprised of center, valve/connector means having four holes rather than three holes. The fourth hole, in effect, will allow water to enter the C,V/C device. Nonetheless, the C,V/C device serves as a "plug" for a succeeding water dispensing pipe. This version will be described in much more detail, but before doing so it also should be specifically noted that an overall irrigation system also might contain both center, valve/connector means having three holes (3-hole C,V/C means) and center valve/connector means having four holes (4-hole C,V/C means). Thus, for example, a first portion of an overall irrigation system might be comprised of a first series of 3-hole C,V/C devices as described above, and a second portion of said irrigation system may be comprised of 4-hole C,V/C devices.

Obviously, if, through the use of a separate plug, a given center, valve/connector means could function (with appropriate valve configurations hereinafter more fully described) as either a 3-hole or a 4-hole C,V/C device, then this would preclude the necessity of having both 3-hole and 4-hole versions of said center, valve/connector means. As in the case of the 3-hole center, valve/connector system, a 4-hole center, valve/connector device system can be adapted to connect a plurality of successive pipes into a two-pipe agricultural irrigation system.

For the purposes of describing this version of the invention such a device can be referred to as a 4-hole center, valve/ connector means (4-hole "C,V/C means"). Here again, the word "means" should be taken to include a plurality of such center, valve/connector means (whether of the 4-hole or the 3-hole variety) which serve to connect adjacent elements of two respective series of parallel pipes. Similarly, in cases where one C,V/C means is emphasized, the expression "center, valve/connector device" ("C,V/C device") also may be employed. In either case, however, use of the word "center" in either designation implies that the valve/connection means will be positioned in a central location between two sets of adjacent pipe elements. Again, two distinct pipe elements are associated with a given 4-hole, C,V/C means. That is to say a first water supply pipe and a first water dispensing pipe will be coupled to one side of the 4-hole C,V/C means and a second water supply pipe and a second water dispensing pipe will be coupled to the opposite sides of that same 4-hole C,V/C means. The second water supply pipe is positioned opposite the first water supply pipe and the second water dispensing pipe is positioned opposite the first water dispensing pipe. Hence, the use of two or more 4-hole C,V/C devices, all having comparable hole locations, sizes, etc., will produce a pipe orientation such that the water supply pipe and water dispensing pipe will be parallel to each other.

The most fundamental version of applicants 4-hole C,V/C system will have at least one such 4-hole C,V/C device and some means, such as an elbow, for connecting the ends of both pipe series to each other. However, any number of successive 4-hole, center valve/ connector devices (2, 3, 4, . . . n) may be connected to the ends of successive water supply and water dispensing pipe elements in order to extend the length of the irrigation system at will. For the purposes of this patent disclosure, such a system of C,V/C means (whether of the 3-hole variety, the 4-hole variety and/or hybrids of these two types) may also be referred to as a "plurality" of such devices. In any case, however, for reasons hereinafter more fully developed, such a system will, in effect, only be limited in length by pumping capacity and/or by natural barriers, legal boundaries, etc., as opposed to being limited by the incidence of falling fluid pressures at more and more distant water dispensing pipes (i.e., distant from a pump or other source of hydrostatic pressure) in a given series. It should also be noted in passing that applicants' system is not limited to "linear" expansion. That is to say that it is contemplated that 90°, 60°, 45°, 30°, etc. "elbow" units may be employed to extend the ends of a given irrigation system in perpendicular and oblique directions with respect to its original line of direction.

Again, aside from the four holes in its housing, each 4-hole C,V/C device is provided with a valve system (and means to operate it) capable of forming at least two chambers in the housing of said 4-hole C,V/C device. Such chambers are related to at least two distinct modes of operation of said 4-hole devices. In a first mode of operation, water flowing under pressure from a water supply source in a first (incoming) direction will enter one side of the 4-hole C,V/C device via a first water supply hole and pipe receiving/coupling means (such as a threaded end, flange, etc.), pass directly through a first chamber formed by valves in the 4-hole C,V/C means and then exit through a second water supply hole and pipe coupling means on the opposite side of said 4-hole C,V/C means. In this first mode of operation, the valve system also prevents the incoming water flow from reaching either the first or the second water dispensing couplings of the 4-hole C,V/C device. Thus the 4-hole C,V/C device, in this first mode of operation, serves to form a chamber which couples the first water supply pipe, in series, with a successive water supply pipe while preventing the incoming water supply from exiting the 4-hole C,V/C device from either of its water dispensing holes.

In its second mode of operation, the 4-hole C,V/C device's valve system forms a second chamber which forces and directs the stream of water coming in the 4-hole C,V/C device, via its first water supply hole, back out of the device and into the (first) water dispensing hole and pipe coupling means located on the same side of the device as an incoming water supply pipe. Thus, the valve system, in its second mode of operation, in effect, blocks fluid flow to the opposite side of the 4-hole C,V/C device. That is to say it blocks fluid flow to both the second water supply hole and the second water dispensing hole.

After passing through the "last" (i.e., most distant from the water supply source) 4-hole C,V/C device of the water supply pipe series, the incoming water is then transferred to a "first" water dispensing pipe. This "first" water dispensing pipe is connected to the downstream side of the "last" 4-hole C,V/C device in a particular pipe series. Again, when the last 4-hole C,V/C device is in its first mode of operation, back flow through the 4-hole C,V/C device is blocked by its valve system in the manner previously noted. Hence, if the first water dispensing pipe has water dispensing holes along its length, streams, sprays, etc. of water will be emitted from said first water dispensing pipe into a first, contiguous, water receiving zone in which agricultural plants are growing. Note that, just as was the case for the separate and distinct water dispensing pipe attached to 3-hole C,V/C devices, the entire water supply, under its full pressure, is delivered only to one first water dispensing pipe at a given time. If such water dispensing holes are found over essentially the entire length of the first pipe, the width of the first water receiving zone will approximate the length of the first water dispensing pipe. Similarly the length of the second, third, etc. water receiving zone, respectively laying continuous to the second, third, etc., water dispensing pipes, will be determined by the holes in said second, third, etc. water dispensing pipes.

Again, the valve system of either the 3-hole or the 4-hole C,V/C device may be constructed with any number of valve configurations and/or valve seating means known to the valve making art. For example any of the 3 or 4 holes (and/or their associated coupling means) in such a C,V/C device may be "blocked" by "ball-shaped" valves, "gate-shaped" valves, "vane-shaped" valves and the like. Other particularly preferred valves are "gates" which are lowered in front of or raised away from the various 4 holes in the C,V/C device as well as lowered and raised to form internal chambers in said C,V/C devices. However, for purposes of simplicity of illustration of the concepts of this patent disclosure such valves will generally be described and discussed as if they had flat gate or vane configurations. For example, most of the 3-hole C,V/C valves will be depicted as having an "I" or "vane" or "gate" configuration. Similarly, many of the 4-hole C,V/C valves illustrated in this patent disclosure will be depicted as constituting a "T"-shaped vane. Such a T-shaped or I-shaped vane also is, in fact, a preferred "real" embodiment of a valve system which can be effectively employed in such 4-hole C,V/C devices. Such a T-shaped vane may be made in a single, monolithic piece; or the "stem" of a T configuration may be rotatable to a point where, in effect, it represents one-half of the top cap or ledge of the T configuration. Thus, this version of a valve could be convertible from a "T" configuration to an "L" configuration and/or an "I" configuration. Consequently, the C,V/C device which a valve serves, could be convertible (with the presence or absence of a plug in a second water dispensing hole) to either a 3-hole C,V/C device which employs an "I" shaped valve configuration or a 4-hole C,V/C device which may employ a "T", "I" or "L" valve configuration.

That is to say, one of the two top halves of the cap of the T may be provided with means of rotation such that the "T" configuration becomes an "L" configuration whose "stem" and "base" portions are most preferably of the same length.

It should also be noted that an ability to switch a given valve from a "T" to an "L" configuration also provides an ability to convert a 4-hole center, valve/connector means into an end, valve/connector means hereinafter more fully described. Similarly, an ability to change from a "T" to an "I" configuration enables a 3-hole C,V/C device to be used as an end, valve connector means. It will of course also be appreciated that a 3-hole C,V/C device having a "I" shaped valve can likewise act as an end, valve/ connector device in such a system.

Again, the means for transferring the incoming flow of water in a system of 4-hole C,V/C devices from the "last" water supply pipe in the system to the "first" water dispensing pipe could be as simple as an "elbow" unit which connects the last water supply pipe of a series to a first water dispensing pipe of that series. However, in some more preferred embodiments of this invention, the means for transferring the incoming water flow from the last water supply pipe back to the first water dispensing pipe is an end, connector/valve means ("E,V/C means" or "E,V/C device", etc.) having an L-shaped valve configuration, as opposed to the T-shaped valve configuration of the C,V/C means. In this case, use of the word "end" implies that the end, connector/valve device is connected to a "last" water supply pipe. It should also be noted in passing that a modified (e.g., modified by plugging one or more of its holes) 4-hole center, valve/ connector means, in a second mode of operation, wherein water coming into the first water supply coupling means is forced out of the first water dispensing pipe, could be employed as an "end" valve connector means. So employed, the two holes on the "downstream" side of a 4-hole C,V/C means are preferably plugged as well as shielded from fluid communication by a valve. Note once again that a hinged "T" shaped valve could be converted into an "L" shaped configuration. Consequently, a 4-hole C,V/C device provided with such a hinged T could easily be converted into an E,V/C device. As previously noted, a 3-hole C,V/C device could, without modification, be employed as such an E, V/C device. Only an appropriate setting of its "I" shaped valve is needed to cause a 3-hole C,V/C device to transfer water from the first water supply pipe to the water dispensing pipe.

However, in some of the most preferred embodiments of the herein disclosed irrigation systems, an E,V/C means can be especially adapted for this purpose. To this end, its valve system will preferably have an "L" shaped configuration rather than the "T" configuration of the C,V/C device. Such an E,V/C device, in its most preferred embodiments, also will have a four hole system much like the four hole system of the center, valve/connector means. However, depending on certain details of use hereinafter more fully described, such E,V/C devices will also have their own distinct first and second modes of operation. Moreover, in either mode of operation, any unemployed water supply coupling is preferably plugged so that the "water tight" nature of the housing can be maintained not only by the valve system, but by the plug or plugs placed on the "downstream" side of the E,V/C device.

The utility of having such a second, water supply hole follows from the fact that such an E,V/C means can be used as the "end", water transferring device, e.g., the left end or the right end of a "left leg" (hereinafter more fully described) of such a system or as the "end" (left end or right end element) of a "right leg" of such a system. Moreover, in ways hereinafter more fully described, the second water dispensing hole of such an E,C/V device, located on its downstream side, could be plugged or it could be attached to an "auxiliary first" water dispensing pipe. Such an auxiliary first water dispensing pipe would have its farthest end plugged so that it was capable of watering an "auxiliary first" water receiving zone located next to the "first" water receiving zone contiguous to the "first" water dispensing pipe. This auxiliary first dispensing zone could be watered through use of a first mode of valve operation wherein the valve forces water coming into the E,V/C unit's first (upstream side) water supply hole and pipe coupling means into fluid communication with its second (downstream side) water dispensing coupling means and hence into fluid communication with the auxiliary first water dispensing pipe while simultaneously blocking fluid communication with the "first" water dispensing pipe attached to said end, valve/connector unit.

The preferred E,V/C device is preferably constructed with four pipe receiving holes even though all four holes are not needed to perform certain water transfer functions. Again, such a 4-hole configuration allows the E,V/C device to be used either on the left end of a pipe series or on the right end of a series. Thus an end, valve/connector means could either be constructed without a second, downstream side water supply pipe hole/coupling means, or such a means, if present, could be plugged. In other words, a four holed E, V/C means can be used as a left "end" element or a right "end" element simply by changing a plug from one side of the device to the other side (e.g., from the downstream water supply hole to the upstream water supply hole). This eliminates the need for a distinct left end unit and a distinct right end E,V/C device. Finally, it should also be noted in passing that such E,V/C means can be modified to act as "elbows" (90°, 60°, 45°, etc.) in an overall irrigation system.

Thus the above discussion serves to show that the inherent potential for variation in such irrigation systems is useful, but not necessary to the most concepts of this invention. Thus, in one of its most fundamental versions, applicants' 3-hole C,V/C irrigation system will be comprised of: (1) at least two successive water supply pipes connected in a water supply pipe series by at least one center, valve/connector means which couples successive pipes of the water supply pipe series; (2) a water dispensing pipe connected to each respective center, valve/connector means which couple successive pipes of the water supply pipe series; (3) means for delivering a water supply to the water supply pipe series; (4) means for blocking flow in the water dispensing pipe; and (5) at least one center, valve/connector means which couples successive pipes of the water supply pipe series and which is connected to the water dispensing pipe to form a two parallel pipe agricultural irrigation system and wherein a center, valve/connector means in said system comprises: (a) a housing having: (i) a first side provided with a first, water supply hole and pipe coupling means and a water dispensing hole and pipe coupling means, (ii) a second side, opposite the first side, provided with a second, water supply hole and pipe coupling means aligned with the first water supply hole and pipe coupling means, and (iii) means for mounting a valve in said housing; (b) a valve, mounted in said housing, so adapted and arranged that said valve can be operated (i) in a first mode of operation wherein fluid communication is established in an incoming flow direction from a water supply into the first, water supply hole and pipe coupling means, through the housing and out of the second, water supply hole and pipe coupling means and thereby creating at least a portion of the water supply pipe series while simultaneously blocking fluid communication of the incoming water supply with the water dispensing hole and pipe coupling means or (ii) in a second mode of operation wherein the valve blocks fluid communication of the water supply with the second, water supply hole and pipe coupling means and thereby forcing the incoming water supply delivered via the first, water supply hole and pipe coupling means to reverse direction in the housing and exit said housing via the water dispensing hole and pipe coupling means, and (c) means for switching the valve from the first mode of operation to the second mode of operation.

Similarly, applicants' 4-hole C,V/C irrigation system will be comprised only of: (1) at least two successive water supply pipes connected in a water supply pipe series by a center, valve/ connector means which couples successive pipes of said water supply pipe series; (2) at least two water dispensing pipes connected in a water dispensing pipe series by the center, valve/connector means which also couples successive pipes of the water supply pipe series; (3) means for delivering a water supply to the water supply pipe series; (4) fluid transfer means for transferring a water supply from the water supply pipe series to the water dispensing pipe series; (5) means for capping or plugging the water dispensing pipe series; and (6) at least one, but again, preferably, a plurality of center, valve/connector means which couple successive pipes of the water supply pipe series and successive pipes of the water dispensing pipe series in a two-pipe agricultural irrigation system wherein at least one center, valve/connector means in said system comprises: (a) a housing having (i) a first side provided with a first, (upstream side) water supply hole and pipe coupling means and a first (upstream side) water dispensing hole and pipe coupling means, (ii) a second side positioned opposite (or "downstream" from) the first side and provided with a second, water supply hole and pipe coupling means aligned with the first water supply hole and pipe coupling means and a second, water dispensing hole and coupling means aligned with the first, water dispensing hole and pipe coupling means and (iii) means for mounting and seating a valve in said housing; (b) a valve system, mounted in said housing, and so adapted and arranged that said valve can be (i) operated in a first mode of operation wherein fluid communication is established in said housing, in an incoming supply water flow direction, from the water supply into the first (upstream side), water supply hole and pipe coupling means, through the housing and out of the second (downstream side), water supply hole and pipe coupling means and thereby creating at least a portion of the water supply pipe series, while simultaneously blocking fluid communication of the water supply with both the first and the second water dispensing hole and pipe coupling means and wherein said first mode of operation of the valve also prevents fluid communication, in a direction opposite to that of the incoming flow direction, between the second, water dispensing hole and pipe coupling means and the first, water dispensing hole and pipe coupling means or (ii) operated in a second mode of operation wherein said valve system also blocks fluid communication of the incoming water supply with both the second, water supply hole and pipe coupling means and the second, water dispensing hole and pipe coupling means and thereby forcing the water supply delivered via the first, water supply hole and pipe coupling means to reverse direction in the housing and exit said housing via the first, water dispensing hole and pipe coupling means, and (c) means for switching the valve from its first mode of operation to its second mode of operation.

In some of the more preferred embodiments of this irrigation system the means for delivering the water supply to the water supply pipe series is a simple pipe coupling device. However, in some preferred embodiments of this invention, the means for transferring the water supply to the water supply pipe series a certain end, valve/connector means comprising: (a) a housing having: (i) a first (upstream) side provided with a first, water supply hole and pipe coupling means and a first, water dispensing hole and pipe coupling means, (ii) a second side, positioned opposite (and hence downstream from) the first side, and provided with a second (downstream) water supply hole and pipe coupling means aligned with the first, water supply hole and pipe coupling means and a second (downstream), water dispensing hole and pipe coupling means aligned with the first, water dispensing hole and pipe coupling means and (iii) means for mounting and seating a valve system in said housing, (b) means for delivering the water supply to the first, water supply hole and pipe coupling means, means for plugging the second, water supply hole and pipe coupling means and means for connecting the second, water dispensing hole and pipe coupling means to the water supply pipe series, (c) a valve system, mounted in said housing, so adapted and arranged that said valve system can be operated (i) in a first mode of operation wherein fluid communication is established in an incoming water supply flow direction from the water supply into the first, water supply hole and pipe coupling means, through the housing and out of the second, water dispensing hole and pipe coupling means and thereby creating a first element of a left leg of a water supply pipe series while simultaneously blocking fluid communication of the water supply with the first water dispensing hole and pipe coupling means or (ii) operated in a second mode of operation wherein the valve blocks fluid communication of the water supply with the second, water dispensing hole and pipe coupling means and the second, water supply hole and pipe coupling means and thereby forcing the water supply delivered via the first, water supply hole and coupling means to exit said housing via its first, water dispensing hole and pipe coupling means and into another right leg of said agricultural irrigation system; and (d) means for switching the valve from the first mode of operation to the second mode of operation. Again, such an end, valve/connector means is most preferably adapted for use on either the left end or on the right end of a given water supply pipe series.

In other preferred embodiments of this invention, the means for capping the water dispensing pipe series is not a cap or pipe plug, but rather an end, valve/connector means comprising: (a) a housing having (i) a first side provided with a first, water supply hole and pipe coupling means and a first, water dispensing hole and pipe coupling means, (ii) a second side, opposite the first side, provided with a second, water supply hole and pipe coupling means aligned with the first, water supply hole and pipe coupling means and a second, water dispensing hole and coupling means aligned with the first, water dispensing hole and pipe coupling means and (iii) means for mounting and seating a valve system in said housing, (b) means for delivering the water supply to the first, water supply hole and pipe coupling means, means for plugging the second, water supply hole and pipe coupling means and means for connecting the second, water dispensing hole and coupling means to the water supply, (c) a valve system, mounted in said housing, so adapted and arranged that said valve can be operated (i) in a first mode of operation wherein fluid communication is established in an incoming flow direction from the water supply into the first, water supply hole and pipe coupling means, through the C,V/C's housing and out of the second, water dispensing hole and pipe coupling means and into a plugged end pipe means while simultaneously blocking fluid communication of the incoming water supply with the first water dispensing hole and pipe coupling means or (ii) in a second mode of operation wherein the valve blocks fluid communication of the incoming water supply with the second, water dispensing hole and pipe coupling means and thereby forcing the water supply delivered via the first, water supply hole and pipe coupling means to reverse direction in the housing and exit said housing via the first, water dispensing hole and pipe coupling means and into the water dispensing pipe series of said agricultural irrigation system, and (d) means for switching the valve from the first mode of operation to the second mode of operation.

In one particularly preferred embodiment, the overall preferred configuration will comprise: (1) at least three successive water supply pipes each connected in a water supply pipe series by at least two center, valve/connector means which couple successive pipes of a water supply pipe series; (2) at least three water dispensing pipes connected in a water dispensing pipe series by the same center, valve/connector means which couple successive pipes of the water supply pipe series; (3) a first end, valve/connector means comprising: (a) a housing having (i) a first side provided with a first, water supply hole and pipe coupling means and a first, water dispensing hole and pipe coupling means, (ii) a second side, opposite the first side, provided with a second, water supply hole and pipe coupling means aligned with the first, water supply hole and pipe coupling means and a second, water dispensing hole and coupling means aligned with the first, water dispensing hole and pipe coupling means and (iii) means for mounting a valve in said housing; (b) means for delivering the water supply to the first, water supply hole and pipe coupling means, means for plugging the second, water supply hole and pipe coupling means and means for connecting the second, water dispensing hole and coupling means to the water supply pipe series; (c) a valve, mounted in said housing, so adapted and arranged that said valve can be operated (i) in a first mode of operation wherein fluid communication is established in an incoming flow direction from the water supply into the first, water supply hole and pipe coupling means, through the housing and out of the second, water dispensing hole and pipe coupling means and thereby creating at least a portion of a water supply pipe series of a first leg of the system while simultaneously blocking fluid communication of the water supply with the first water dispensing hole and pipe coupling means or (ii) in a second mode of operation wherein the valve blocks fluid communication of the water supply with the second, water dispensing hole and pipe coupling means and the second, water supply hole and pipe coupling means and thereby forcing the water supply delivered via the first, water supply hole and pipe coupling means to reverse direction in the housing and exit said housing via the first, water dispensing hole and pipe coupling means and into another leg of said agricultural irrigation system; and (d) means for switching the valve from the first mode of operation to the second mode of operation; (4) a second end, valve/connector means comprising: (a) a housing having (i) a first side provided with a first, water supply hole and pipe coupling means and a first, water dispensing pipe coupling means, (ii) a second side, opposite the first side, provided with a second, water supply hole and pipe coupling means aligned with the first, water supply hole and pipe coupling means and a second, water dispensing coupling means aligned with the first, water dispensing hole and pipe coupling means and (iii) means for mounting a valve in said housing; (b) means for delivering the water supply to the first, water supply hole and pipe coupling means, means for plugging the second, water supply hole and pipe coupling means and means for plugging the second, water dispensing hole and coupling means; (c) a valve, mounted in said housing, so adapted and arranged that said valve can be operated: (i) in a first mode of operation wherein fluid communication is established in an incoming flow direction from the water supply into a first, water supply hole and pipe coupling means, through the housing and out of the second, water dispensing hole and pipe coupling means and thereby forcing the water supply delivered via the first, water supply hole and pipe coupling means to reverse direction in the housing and exit said housing via the first, water dispensing hole and pipe coupling means and into another leg of said agricultural irrigation system while simultaneously blocking fluid communication of the water supply with the first water dispensing hole and pipe coupling means or (ii) in a second mode of operation wherein the valve creates fluid communication of the incoming water supply with the second, water dispensing hole and pipe coupling means; (d) means for switching the valve from the second mode of operation to the first mode of operation; and (5) at least two center, valve/connector means which couple successive pipes of the water supply pipe series and successive pipes of the water dispensing pipe series in a parallel configuration and wherein each center, valve/connector means in said system comprises: (a) a housing having (i) a first side provided with a first, water supply hole and pipe coupling means and a first, water dispensing hole and pipe coupling means, (ii) a second side, opposite the first side, provided with a second, water supply hole and pipe coupling means aligned with the first water supply hole and pipe coupling means and a second, water dispensing hole and pipe coupling means aligned with the first, water dispensing hole and pipe coupling means and (iii) means for mounting a valve in said housing; (b) a valve, mounted in said housing, so adapted and arranged that said valve can be operated (i) in a first mode of operation wherein fluid communication is established in an incoming flow direction from the water supply into the first, water supply hole and pipe coupling means, through the housing and out of the second, water supply hole and pipe coupling means and thereby creating at least a portion of the water supply pipe series and simultaneously blocking fluid communication of the incoming water supply with both the first and the second water dispensing hole and pipe coupling means and wherein said first mode of operation of the valve also prevents fluid communication, in a direction opposite to that of the incoming flow direction, between the second, water dispensing hole and pipe coupling means and the first, water dispensing hole and pipe coupling means or (ii) in a second mode of operation wherein the valve blocks fluid communication of the water supply with both the second, water supply hole and pipe coupling means and the second, water dispensing hole and pipe coupling means and thereby forcing the water supply delivered via the first, water supply hole and coupling means to reverse direction in the housing and exit said housing via the first, water dispensing and coupling means, and (c) means for switching the valve from the first mode of operation to the second mode of operation.

DESCRIPTION OF THE DRAWINGS

This invention also can be described in more detail with reference to the accompanying drawings wherein:

FIG. 4 is a fragmentary, top sectional view of a more complex version of the apparatus of this patent disclosure being used to water an auxiliary, first water irrigation zone.

FIG. 5 depicts the apparatus of FIG. 4 being used to water another irrigation zone.

FIG. 6 depicts the apparatus of FIG. 4 watering yet another irrigation zone.

FIGS. 7, 8 and 9 respectively depict a first, a second, and third a stage of the herein disclosed agricultural irrigation methods in a "right leg" of an overall irrigation system constructed according to the teachings of this patent disclosure.

FIG. 10 depicts an overall irrigation system having a right and a left leg wherein the left leg is dispensing water while the right is being blocked off by use of a water supply valve which is connected to both the left and the right legs.

FIG. 11 depicts use of a right leg of the irrigation system while the left leg is blocked off by operation of a species of E,V/C means.

FIGS. 12A–12D depict various preferred embodiments of a version of this invention wherein 3-hole, center, valve/connector devices are employed.

FIGS. 13A–13H depict various details of a housing and valve system for a 3-hole center, valve/connector device.

DESCRIPTION OF PREFERRED EMBODIMENTS

Figure 1:
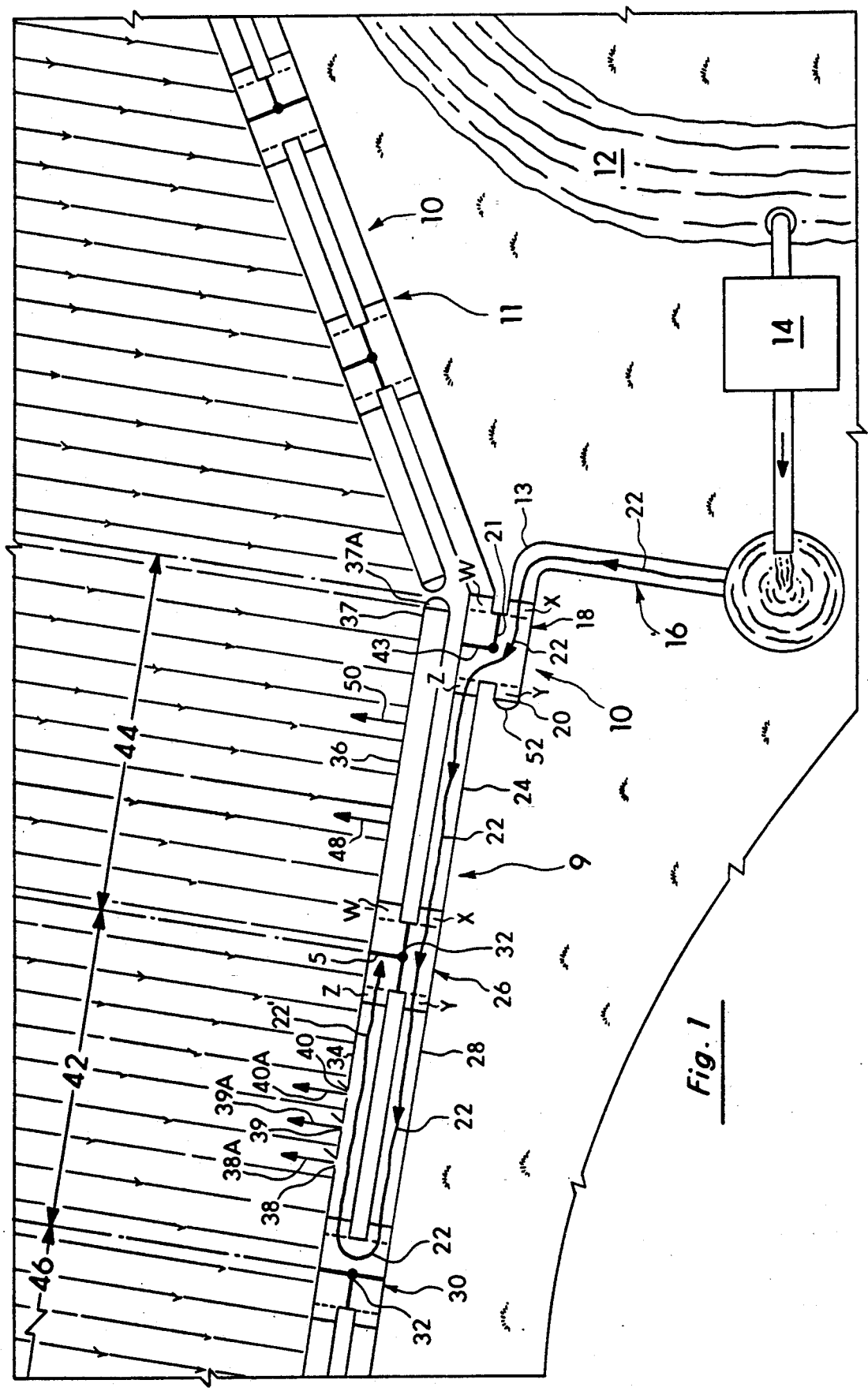
FIG. 1 is a perspective, partial fragmentary, view of a version of our agricultural irrigation system having a left leg and a right leg.

FIG. 1 depicts an agricultural irrigation system 10 constructed according to the teachings of this patent disclosure. Use of the system 10 assumes (1) a water source 12 such as a water ditch, well, etc., (2) a water pressure producing means such as pumping system 14 for putting the water taken from the water source 12 under pressure and (3) a conduit 16 for delivering said water, under pressure, to the irrigation system 10. The particular version of the irrigation system 10 shown in FIG. 1 is depicted with a left leg 9 and a right leg 11 which are each eventually connected to an initial coupling means 13 for coupling a water delivering conduit 16 with the irrigation system 10.

A first element 18 in the irrigation system 10 could be simply a pipe unit, but in some of the most preferred embodiments of this invention, the first element 18 of the system 10 is an end, valve/connector means 20, such as the one shown in FIG. 1, having 4 holes W, X, Y and Z and having a valve means 21 hereinafter more fully described for selectively blocking or opening said holes W, X, Y and Z. Such an end, valve/connector means 20 (or simply a pipe provided with suitable coupling means (threads, flanges, couples, etc. known to the art) serves to direct an incoming water supply stream 22 (via the path indicated from holes X to Z) into a first water supply pipe 24, through a first, center, valve/connector means 26, (via a path from holes X to Y as indicated) through a second water supply pipe 28 and into a second, center, valve/connector means 30. The stream of water 22 depicted in FIG. 1 does not however pass through the second, center, valve/connector means 30 as it did through the first center, valve/connector means 26, but rather has its direction of flow reversed by a valve system 33 in a second mode of operation whose function is to direct passage of the incoming stream of water 22 from the first incoming water supply hole X to outgoing water dispensing hole W and into a first dispensing pipe 34. The water stream 22 so reversed in its direction of flow is shown directed in a new direction of flow 22' which is in effect opposite to the direction of flow of the incoming water supply stream 22. The reverse or opposite flow 22' of water in the first water dispensing pipe 34 is however eventually blocked by an element F of valve system 5 of the first, center valve/connector unit 26. That is to say that the reverse water flow 22' does not pass through the center valve/connector unit 26 (via hole W and on into water dispensing pipe 36, which is attached to, and positioned parallel to the first, water supply pipe 24), but rather has its flow blocked by vane element F of a valve 5 when center, valve/ connector element 26 is in its previously noted first mode of operation.

Water dispensing pipe 34 (along with the other water dispensing pipes of the dispensing pipe series) is provided with an array of holes 38, 39, 40, etc. (such as those holes shown in FIG. 1H) which dispense respective jets of water 38A, 39A and 40A, etc. on respective contiguous areas to be watered. Again such watering can be aided by spray nozzles, water distribution furrows and/or sub-systems of irrigation apparatus (sub-pipes, root-watering systems, etc.) which are not shown in FIG. 1. In any event, such use of valve system 32, in effect, delivers the entire water supply to a contiguous water irrigation zone 42 thereby serving to define said irrigation zone 42 with a length which is indicated by arrow 42. Irrigation zone 42 is watered exclusively while all other preceding or subsequent counterpart irrigation zones 44, 46, etc. are blocked off from the incoming water supply stream 22. Thus the entire water supply stream 22, under its full head of pressure, is delivered to, and dispensed from water dispensing pipe 34.

After zone 42 has received a desired amount of fluid (water, nutrient fluid, insecticide, etc.), which can be controlled by hand, clock or remote control device, the valve system 5 of center, valve connector means 26 is turned to the second mode of operation analogous to the mode of operation depicted for valve 33 of the second, center valve/connector means 30. Hence, fluid communication with the second water supply pipe 28 is blocked off and the incoming water supply stream 22 will be forced into the water dispensing pipe 36 attached to the first, center valve/connector means 26. The downstream end 37 of water dispensing pipe 36 is depicted as being "plugged". Any pipe plugging device 37A known to the art can be employed for this purpose. Hence water streams 48, 50, etc. would then only be dispensed from water dispensing pipe 36.

It should also be noted that the first element 18 of the agricultural irrigation system 10 depicted in FIG. 1 is an E,V/C means 20 which enables the incoming stream of water 22, from delivery conduit 16, to be directed into either the left leg 9 or the right leg 11 of the overall irrigation system 10. It has its unused pipe coupling means 52 plugged as indicated. The end, valve/connector means 20 is shown with an "L"-shaped valve system 43 rather than the "T"-shaped valve system employed in the center, valve connector means 26, 30, etc. It should also be noted that such an L-shaped valve 21 enables the incoming stream of water 22 to be readily directed to either leg 9 or leg 11 of the overall irrigation system 10 depending on the position of said valve 21. Thus, rotating valve 21 ninety degrees, counter clockwise would direct the stream of water 22 into the right leg 11 of the irrigation system 10. Again, those skilled in this art also will appreciate that the valves of both the end, valve/connector means 20 and all subsequent center, valve/connector means 26, 30, etc. may be operated by hand, local timers and/or remotely controlled valve operating devices including computer programmed and operated devices including those activated by radio signals between a central processing unit and each of the individual valve operating devices in the overall system 10.

Figure 1A:
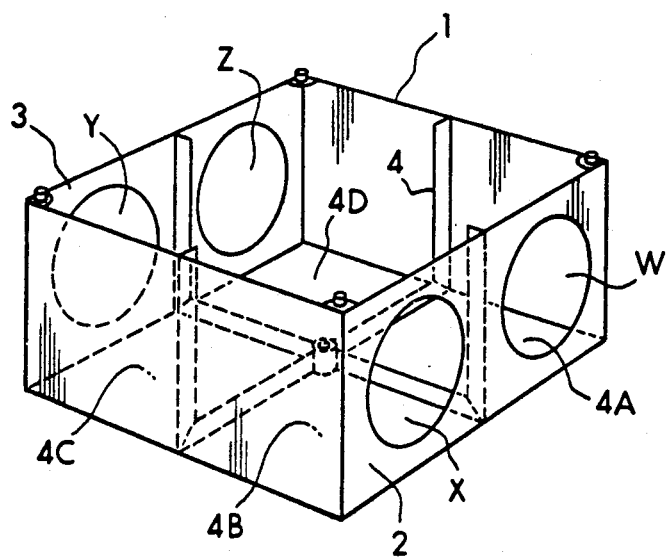
FIGS. 1A, 1B, 1C, and 1D show details of a preferred valve arrangement for the C,V/C device of this patent disclosure.

FIG. 1A is a perspective view of a representative center, valve connector device 26 such as the one depicted as item 26 in FIG. 1. It is comprised of a housing 1 having a right side 2 and a left side 3. The housing 1 has four holes W, X, Y, and Z for receiving pipes. The holes will further comprise coupling means (threading, flanges, automatic coupling devices, etc. known to the art), not shown in FIG. 1. The holes W and X shown on the right side 2 of the housing 1 may be of the same diameter or may be of different diameters. Holes Y and Z on the left side 3 of the housing 1 may likewise be of the same or different diameters. However, opposing holes X and Y or W and Z should be of the same diameter. Relating this device 26 to FIG. 1, hole X could receive the first water supply pipe 24, hole W could receive water dispensing pipe 36. Similarly, hole Y could receive water supply pipe 28 and hole Z could receive water dispensing pipe 34. Obviously, connection of the two types of pipes to a series of such center, valve/connector means will hold a "string" or series of the water supply pipes in a parallel relationship to a string or series of the water dispensing pipes. Housing 1 is shown provided with a valve seating means 4 which is shown in a four-spoke configuration which divides the center, valve/connector device 26 into 4 quadrants 4A, 4B, 4C and 4D.

Figure 1B:
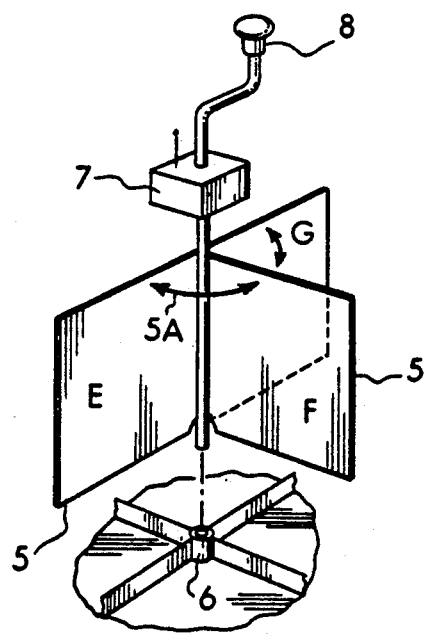
Figure 1C:
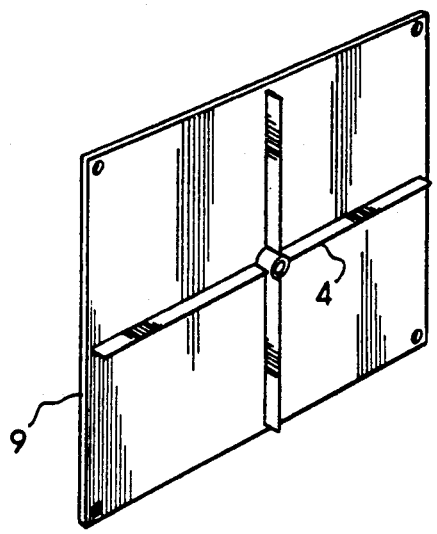
Figure 1D:
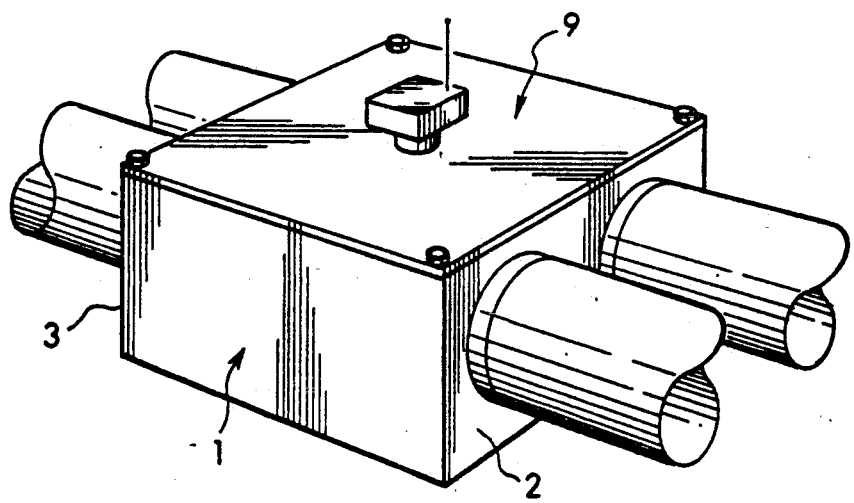
Figure 1I:
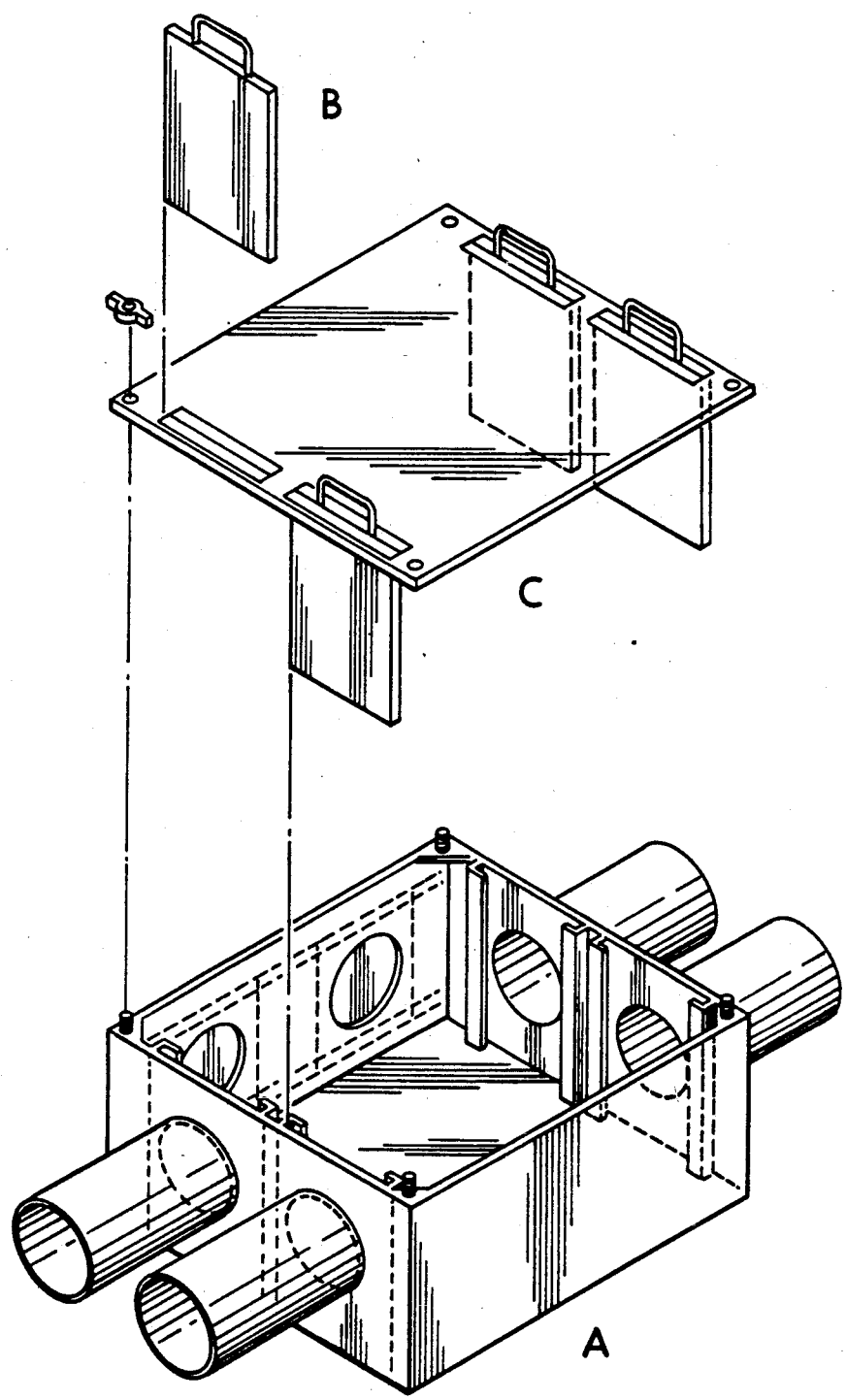
FIG. 1H shows a representative gate valve means for a water dispensing pipe and FIGS. 1E, 1F and 1G show an alternative valve system employing ball-shaped valves rather than gate or vane-shaped valves.

FIG. 1B depicts a valve system 5 having a tripartite vane system. The valve system 5 is depicted in a "T"-shaped configuration having three vanes E, F and G, which are preferably of equal length. However, it should be noted that rotational arrow 5A is intended to depict the idea that vane F can be rotated so that valve 5 would have a straight line configuration and/or that vane E or G can be rotated to produce a valve system 5 with an "L" configuration. The general operation of the valve system 5 is represented by the presence of a pivot 6 which forms a hub of the valve seating means 4. Mechanical, electrical and remote control devices, for operating the valve system 5, known to the art are all depicted as timer device 7. Hand operation of the valve system 5 is depicted by handle 8. FIG. 1C shows the presence of a valve seating means 4 on the underside of a lid 9 to the housing 1. FIG. 1D shows the lid 9 positioned on the housing 1.

FIGS. 1E, 1F and 1G are intended to show that other valve configuration means such as ball check valves can replace the T-shaped vane valve system 5 shown in FIG. 1B in order to practice this invention. FIG. 1H depicts a sliding gate system which can be used to selectively cover or expose water dispensing holes of various sizes in the water dispensing pipe units.

FIGS. 1-I (A, B and C) and 1-V (A, B and C) depict a vertically moving gate valve system which could be used in this invention in place of the T-shaped valve depicted in FIGS. 1A and 1B which rotates from its first mode of operation to its second mode of operation.

Figures 2, 3:
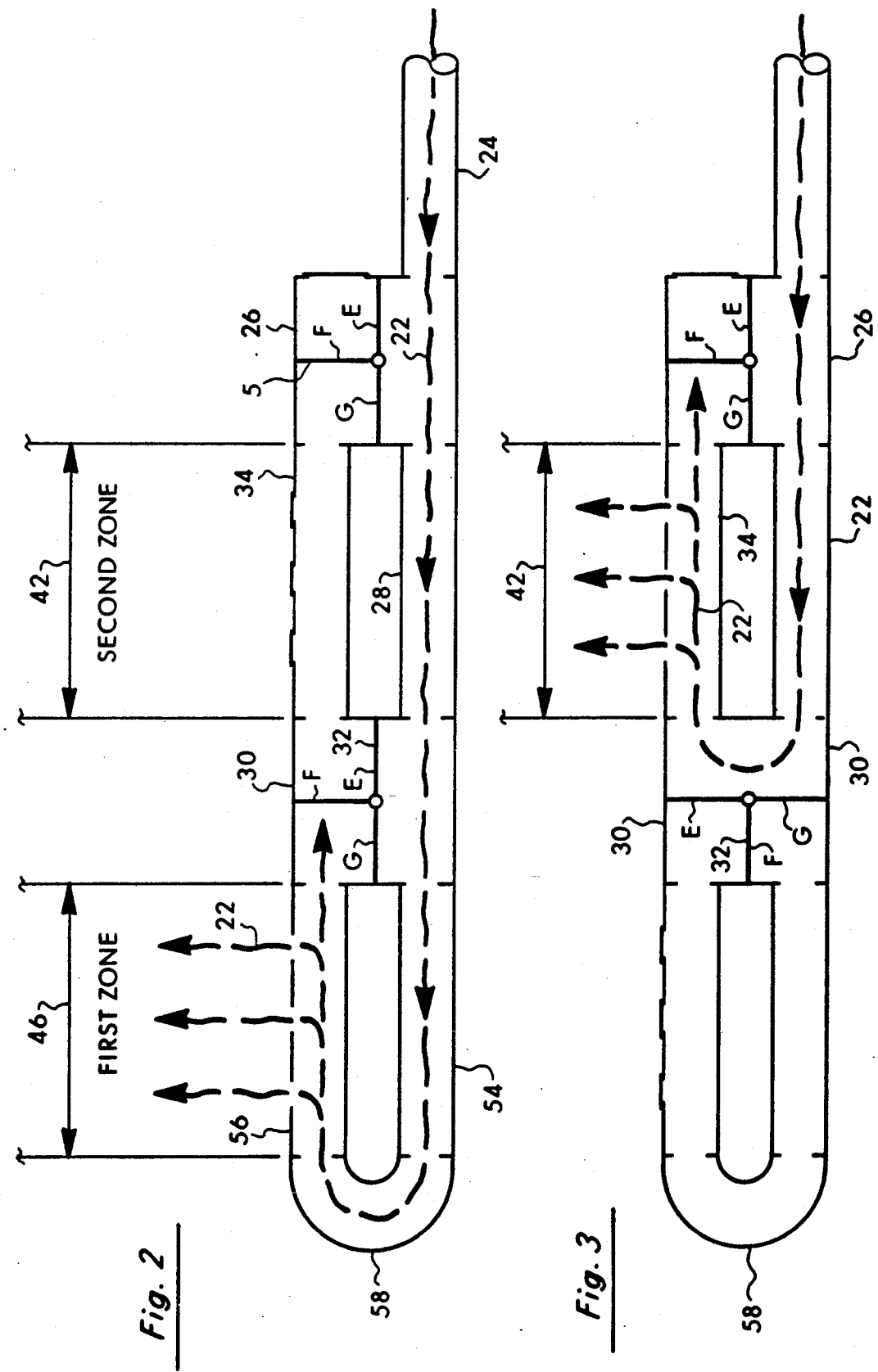
FIG. 2 is a fragmentary, top sectional view of a fundamental version of the apparatus of this patent disclosure being used to irrigate a first water irrigation zone.
FIG. 3 is a fragmentary, top sectional view of apparatus shown in FIG. 2 being used to irrigate a second water irrigation zone.

FIG. 2 shows a version of the apparatus for carrying out the teachings of this patent disclosure wherein a water stream 22 passes through water supply pipe 24 center, valve/ connector means 26, water supply pipe 28 center, valve/connector means 30 and water supply pipe 54. Thereafter it is transferred to a "first" water dispensing pipe 56 from which it is dispensed in water dispensing zone 46. The transfer is accomplished by means of an elbow pipe unit 58 which also serves to reverse the direction of water flow. This reverse flow of water 22' is however blocked by vanes F and G of valve system 32 of center, valve connector means 30.

FIG. 3 depicts center, valve/connector means 30 with valve elements E and G of valve system 32 serving to block fluid flow through the valve/connector means 30 and forcing the incoming water flow 22 in a reverse direction 22' into water dispensing pipe 34 from which it is dispensed under pressure into water dispensing zone 42 by virtue of the fact that its reverse flow 22' is blocked by vanes F and G of center, valve/connector means 26.

FIG. 4 depicts a preferred embodiment of this invention wherein an elbow unit such as that shown in FIGS. 2 and 3 as item 58 is replaced with an end, valve/connector means 59. It is provided with an "L-shaped" valve 60 having two vanes F' and G' formed at right angles to each other. A hole Y of end, valve/ connector means 59 is shown plugged with a plug 61 in order to prevent loss of the incoming stream of water 22. When the valve 60 is in the position depicted in FIG. 4 (i.e., its "first" mode of operation) the incoming water stream 22 is directed into an "auxiliary first" water dispensing pipe 62 which waters a contiguous "auxiliary first" water dispensing zone 64. Here again the full volume and pressure of the incoming stream of water 22 is delivered only to water dispensing zone 64 while flow into water dispensing pipe 30 is blocked by vanes F' and G' of end, valve/connector device 59.

FIG. 5 depicts fluid flow through end, valve/connector means 59 in its "second" mode of operation wherein vanes F' and G' of valve 60 block hole Z while plug 61 blocks hole Y. Hence, the full volume and pressure of incoming stream 22 is delivered, as a reverse flow 22', to water dispensing pipe 34 from which it is delivered to water dispensing zone 46 by virtue of the fact that said reverse flow 22' is blocked by vanes F and G of valve 5 of C,V/C means 26. Here again, the full flow and pressure of the water supply is delivered just to water dispensing pipe 34.

FIG. 6 shows water being dispensed by water dispensing pipe 36 by virtue of the fact that valve 5 of center, valve/connector means 26 is in its second mode of operation wherein downstream holes Y and Z are blocked and water coming into a second chamber created by said second mode of operation is directed out of hole W of C,V/C means 26 and into water dispensing pipe 36. Once again, return flow 22' is blocked by a valve stem element F of a successive C,V/C means 25.

FIG. 7 depicts a right leg 11 of such an irrigation system 10. Note that the end, valve/ connector means 59' can be adapted from the end, valve/connector means 59 shown in FIG. 4. That is to say plug 61 covering hole Y in FIG. 4 is removed and located as plug 61' over hole X of C,V/C means 59' in the manner indicated in FIG. 7 so that a first, right irrigation zone 66 receives the full water pressure while E,C/V means 59' is in its first mode of operation.

FIG. 8 depicts E,V/C means 59' in its second mode of operation so that irrigation zone 68 receives the entire flow of water.

FIG. 9 depicts an end, valve/connector means 20 such as that depicted in FIG. 1 employed as valve/connector means to direct the water stream 22 into the left leg 9 via its holes X and Z (hole Y is plugged) or direct the water stream into the right leg 11 when the L-shaped valve means is rotated 90° counterclockwise as in FIG. 11.

FIG. 10 shows an E,V/C device which is fashioned into a 90° "elbow" unit.

FIG. 11 shows end, valve/connector means 20 in its second mode of operation wherein incoming water stream 22 is directed through holes X and W into right leg 11 by virtue of the fact that holes Z and Y are plugged or blocked.

FIGS. 12A through 12D depict various irrigation systems which employ a series of 3-hole center, valve/connector devices 100, 102 and 104 connected into an irrigation system configured according to one version of this invention. For example, each 3-hole C,V/C device shown in FIG. 12A is shown with its respective valve 101, 103 and 105 in its first (or "pass through") mode of operation. The "I"-shaped configuration of the respective valves are emphasized in this figure, but again other valve shapes would be possible. That is to say that in FIG. 12A a water supply stream 106 is shown passing through each of the 3-hole C,V/C devices 100, 102 and 104. It should also be noted that 3-hole C,V/C device 100 is shown provided with a water dispensing pipe 110 which is, in turn, provided with a plug 112. Similarly, C,V/C device 102 is shown provided with a water dispensing pipe 114 having a plug 116 on its end opposite to the end connected to C,V/C device 102. FIG. 12A also, for sake of illustration only, depicts water 118 being dispensed from an end pipe 120, having a plug 122, which extends from a water dispensing pipe which occupies a position "normally" occupied by a water supply pipe.

FIG. 12B shows the irrigation system of FIG. 12A in its second mode of operation wherein an "I"-shaped valve 101 of a 3-hole C,V/C device 100 is emphasized in a second mode of operation wherein the valve is turned perpendicular to the flow of water stream 106. Hence, water 126 is dispensed from water dispensing pipe 110 of C,V/C device 100 rather than being dispensed out of pipe 120 as in the case of the configuration shown in FIG. 12A.

FIG. 12C represents a version of a 3-hole C,V/C system wherein successive water dispensing pipes 128, 130, etc. are physically connected to a preceding 3-hole C,V/C device. Thus, water dispensing pipe 128 of succeeding C,V/C device 130 is physically connected to preceding C,V/C device 132. However, there is no fluid communication between water dispensing pipe 128 and C,V/C unit 132 as indicated by the notation "no hole" with respect to said C,V/C device 132. Similarly, water dispensing pipe 133 is physically connected to preceding C,V/C device 134, but not placed in fluid communication with said device 134. As previously noted, a plug 135, threaded on both ends, could serve to plug a hole 137 in 4-hole C,V/C device 132 and thereby produce a "no hole" or 3-hole C,V/C configuration. Such a plug could of course also serve to physically connect water dispensing pipe 128 to C,V/C device 132. Obviously, if the plug 135 has a solid core no fluid communication is possible between said pipe 128 and C,V/C device 132. Plug 174 of FIG. 13H further illustrates, from a top view, how such a plug 174 might be employed in the practice of this invention. FIG. 12C also depicts water being dispensed from a water dispensing pipe 133 owing to the fact that valve 136 of 3-hole C,V/C device 132 is in a mode of operation which blocks the flow of water stream 106 through said C,V/C device 132 and, in effect, forces said water stream 106 into water dispensing pipe 133.

FIG. 12D depicts a "hybrid" system employing both 3-hole C,V/C devices 100, 102 and 103 which are connected with a series of 4-hole C,V/C devices 138, 140 and 142.

Figures 13D, 13E:
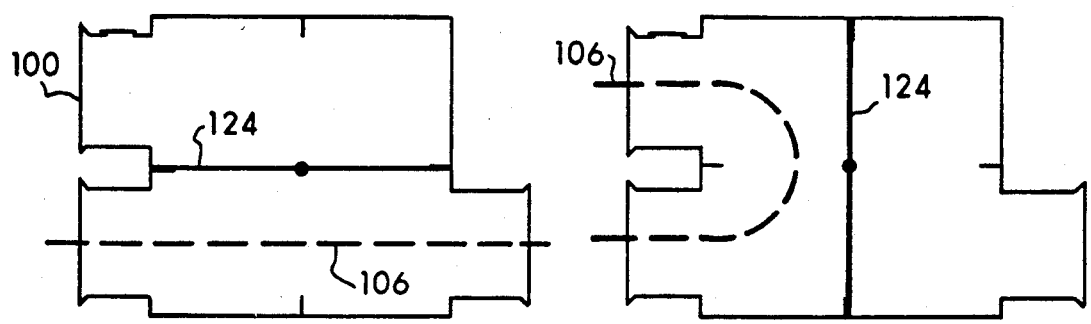

FIGS. 13A through 13G depict details of various versions of 3-hole C,V/C devices employed according to the teachings of patent disclosure. FIG. 13A for example shows a perspective view of a highly "stylized" housing 144 for a 3-hole C,V/C device. It is shown provided with holes 146 and 148 on a first side and hole 150 on a second, opposite side. A hole 151 could be placed opposite hole 148; or this part of the housing 144 could be solid as depicted by the designation "no hole" and/or phantom circle in FIG. 13A. If housing 144 does, in fact, have a hole 151 then a plug 154 will be affixed, as by cooperating threading system 156 which would threadedly engage threads of hole 151 which are not shown.

FIG. 13B depicts a valve system 158 which cooperates with valve seating system 152. As indicated, the valve system 158 can be operated by a timer device 160 and/or a hand operated device 162. Such a valve system 158 may also be remotely controlled by radio devices in conjunction with CPU operated computer programs.

FIG. 13C is a perspective view of a top 159 for housing 144 of FIG. 13A.

FIG. 13D shows a top view of a 3-hole C,V/C device 100 having its valve 124 in a first mode of operation which, in effect, allows a stream of water 106 to pass through said 3-hole C,V/C device 100.

FIG. 13E shows a top view of the device of FIG. 13D wherein the valve 124 is in its second mode of operation such that the direction of flow stream of water 106 is reversed in the device 100. The housing 144 of this C,V/C device is shown with a solid surface 164 and the designation "no hole" to indicate that it is literally "no hole" in the 3-hole device, or that, if there is a hole, it is completely blocked.

Figures 13F, 13G:
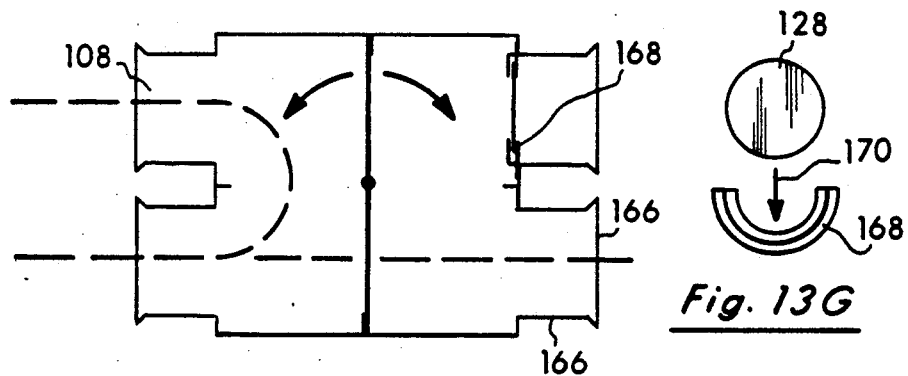

FIG. 13F shows a 3-hole C,V/C device 166 having a pipe holder section 168. Such a pipe holder section 168 could have, for example, a half-round configuration such that the end of a pipe could be laid into said half round opening in the manner generally depicted in FIG. 13G.

FIG. 13G depicts an end view of a pipe holder device 168 having a half-round configuration capable of receiving (as depicted by arrow 170) the end of a water dispensing pipe such as water dispensing pipe 128 of FIG. 12C.

Figure 13H:
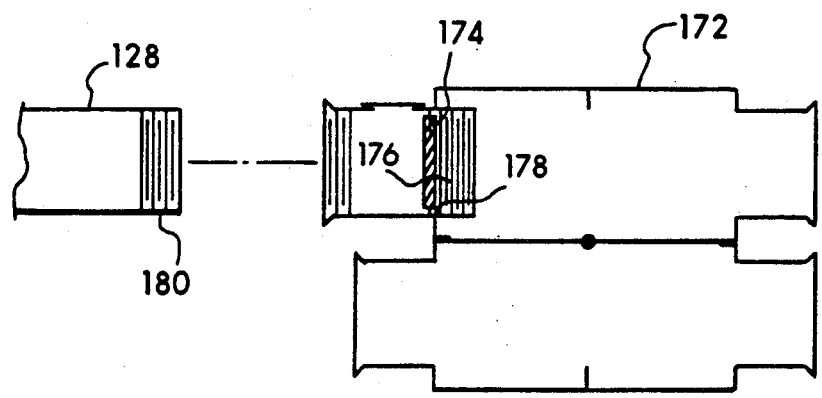

FIG. 13H depicts a "3-hole" C,V/C device 172 having a plug 174 threadedly engaged with threads 176 in a fourth hole 178 in said C,V/C device 172. That is to say that this "3-hole" device really has 4 holes, but the fourth hole closed to fluid communication by a plug 174 having a solid body which does not have any water passage hole through its core section. Thus, plug 174 can serve to both block hole 178 and connect a threaded end 180 of a pipe 128 to the C,V/C device 172.

Those skilled in this art also will appreciate that while certain preferred embodiments of this irrigation apparatus are described above, they are given by way of illustration only. They are not intended as limitations since this patent disclosure is intended to cover all modifications, alternatives and equivalents falling within the scope and spirit of this invention as expressed in the appended claims.

Thus having disclosed our invention, we claim:

1. A two pipe agricultural irrigation system comprising:
   (1) at least two successive water supply pipes connected in a water supply pipe series by center, valve/connector means which couple successive pipes of the water supply pipe series;
   (2) a water dispensing pipe connected to each respective center, valve/connector means which couple successive pipes of the water supply pipe series;
   (3) means for delivering a water supply to the water supply pipe series;
   (4) means for blocking flow in the water dispensing pipe; and
   (5) at least one center, valve/connector means which couples successive pipes of the water supply pipe series and which is connected to the water dispensing pipe to form a two parallel pipe agricultural irrigation system and wherein a center, valve/connector means in said system comprises:
      (a) a housing having: (i) a first side provided with a first, water supply hole and a first water dispensing hole, (ii) a second side, opposite the first side, provided with a second, water supply hole aligned with the first water supply hole, (iii) a second water dispensing hole, aligned with the first water dispensing hole and wherein said second water dispensing hole further comprises means for attaching a device capable of blocking flow through said second water dispensing hole and (iv) means for mounting a valve in said housing;
      (b) a valve, mounted in said housing, so adapted and arranged that said valve can be operated (i) in a first mode of operation wherein fluid communication is established in an incoming flow direction from the water supply into the first, water supply hole, through the housing and out of the second, water supply hole and thereby creating at least a portion of the water supply pipe series while simultaneously blocking fluid communication of the incoming water supply with the water dispensing hole, (ii) in a second mode of operation wherein the valve blocks fluid communication of the water supply with the second, water supply hole and thereby forcing the incoming water supply delivered via the first, water supply hole to reverse direction in the housing and exit said housing via the first water dispensing hole; and
      (c) means for switching the valve from the first mode of operation to the second mode of operation.

2. The irrigation system of claim 1 wherein a plurality of center, valve/connector means are used to construct said system.

3. The irrigation system of claim 1 wherein the means for delivering the water supply to the water supply pipe series is a pipe coupling device.

4. The irrigation system of claim 1 wherein the means for blocking flow in the water dispensing pipe is a plug located on the end of the dispensing pipe opposite the end of the pipe which is connected to the center, valve/connector means.

5. The irrigation system of claim 1 wherein the means for blocking the water dispensing pipe series is a center, valve/connector means comprising:
   (a) a housing having: (i) a first side provided with a first, water supply hole and a water dispensing hole, (ii) a second side, opposite the first side, provided with a second, water supply hole aligned with the first, water supply pipe and a water blocking and pipe coupling means aligned with the first, water dispensing hole and pipe coupling means and (iii) means for mounting a valve in said housing;
   (b) a valve, mounted in said housing, so adapted and arranged that said valve can be operated (i) in a first mode of operation wherein fluid communication is established in an incoming flow direction from the water supply into the first, water supply hole through the housing and out of the second, water supply hole and thereby creating at least a portion of a water supply pipe series while simultaneously blocking fluid communication of the incoming water supply with the water dispensing hole or (ii) in a second mode of operation wherein the valve blocks fluid communication of the water supply with the second, water supply hole and thereby forcing the incoming water supply, delivered via the first water supply hole, to reverse direction in the housing and exit said housing via the water dispensing hole, and
   (c) means for switching the valve from the first mode of operation to the second mode of operation.

6. A two pipe agricultural irrigation system comprising:
   (1) at least three successive water supply pipes connected in a water supply pipe series by center, valve/connector means which couple successive pipes of the water supply pipe series;
   (2) a water dispensing pipe connected to each respective center, valve/connector means which couple successive pipes of the water supply pipe series;
   (3) means for delivering a water supply to the water supply pipe series;
   (4) means for blocking flow in the water dispensing pipe; and
   (5) at least one center, valve-connector means which couples successive pipes of the water supply pipe series and which is connected to the water dispensing pipe to form a two parallel pipe agricultural irrigation system and wherein a center, valve/connector means in said system comprises:
   (a) a housing having: (i) a first side provided with a first, water supply hole and pipe coupling means and a first water dispensing hole and pipe coupling means, (ii) a second side, opposite the first side, provided with a second, water supply hole and pipe coupling means aligned with the first water supply hole and pipe coupling means, (iii) a second water dispensing hole, aligned with the first water dispensing hole and wherein said second water dispensing hole further comprises means for attaching a device capable of blocking flow through said second water dispensing hole and (iv) means for mounting a valve in said housing;
   (b) a valve, mounted in said housing, so adapted and arranged that said valve can be operated (i) in a first mode of operation wherein fluid communication is established in an incoming flow direction from the water supply into the first, water supply hole and pipe coupling means, through the housing and out of the second, water supply hole and pipe coupling means and thereby creating at least a portion of the water supply pipe series while simultaneously blocking fluid communication of the incoming water supply with the water dispensing hole and pipe coupling means or (ii) in a second mode of operation wherein the valve blocks fluid communication of the water supply with the second, water supply hole and pipe coupling means and thereby forcing the incoming water supply delivered via the first, water supply hole and pipe coupling means to reverse direction in the housing and exit said housing via the first water dispensing hole and pipe coupling means, and
   (c) means for switching the valve from the first mode of operation to the second mode of operation.

7. The irrigation system of claim 6 wherein a plurality of center, valve/connector means are used to construct said system.

8. The irrigation system of claim 6 wherein the means for delivering the water supply to the water supply pipe series is a pipe coupling device.

9. The irrigation system of claim 6 wherein the means for blocking flow in the water dispensing pipe is a plug located on the end of the dispensing pipe opposite the end of the pipe which is connected to the center, valve/connector means.

10. The irrigation system of claim 6 wherein the means for blocking the water dispensing pipe series is a center, valve/connector means comprising:
   (a) a housing having (i) a first side provided with a first, water supply hole and pipe coupling means and a water dispensing hole and pipe coupling means, (ii) a second side, opposite the first side, provided with a second, water supply hole and pipe coupling means aligned with the first, water supply pipe coupling means and a water blocking and pipe coupling means aligned with the first, water dispensing hole and pipe coupling means, and (iii) means for mounting a valve in said housing;
   (b) a valve, mounted in said housing, so adapted and arranged that said valve can be operated (i) in a first mode of operation wherein fluid communication is established in an incoming flow direction from the water supply into the first, water supply hole and pipe coupling means, through the housing and out of the second, water supply hole and pipe coupling means and thereby creating at least a portion of the water supply pipe series while simultaneously blocking fluid communication of the incoming water supply with the water dispensing hole and pipe coupling means, or (ii) in a second mode of operation wherein the valve blocks fluid communication of the water supply with the second, water supply hole and pipe coupling means and thereby forcing the incoming water supply delivered via the first, water supply hole and pipe coupling means to reverse direction in the housing and exit said housing via the water dispensing hole and pipe coupling means, and
   (c) means for switching the valve from the first mode of operation to the second mode of operation.

* * * * *